United States Patent
Jang et al.

(10) Patent No.: US 12,513,299 B2
(45) Date of Patent: Dec. 30, 2025

(54) IMAGE ENCODING/DECODING METHOD AND APPARATUS USING USER-DEFINED PALETTE ENTRY, AND METHOD FOR TRANSMITTING BITSTREAM

(71) Applicant: LG ELECTRONICS INC., Seoul (KR)

(72) Inventors: Hyeong Moon Jang, Seoul (KR); Seethal Paluri, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/825,978

(22) Filed: Sep. 5, 2024

(65) Prior Publication Data

US 2025/0071284 A1    Feb. 27, 2025

Related U.S. Application Data

(63) Continuation of application No. 17/763,054, filed as application No. PCT/KR2020/012900 on Sep. 23, 2020, now Pat. No. 12,126,807.

(60) Provisional application No. 62/911,961, filed on Oct. 7, 2019, provisional application No. 62/905,413, filed on Sep. 25, 2019, provisional application No. 62/904,557, filed on Sep. 23, 2019.

(51) Int. Cl.
*H04N 19/132*    (2014.01)
*H04N 19/174*    (2014.01)
*H04N 19/176*    (2014.01)
*H04N 19/186*    (2014.01)

(52) U.S. Cl.
CPC ......... *H04N 19/132* (2014.11); *H04N 19/174* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | |
|---|---|---|---|
| 2004/0205691 A1* | 10/2004 | Poole | G06F 8/20 717/100 |
| 2018/0098092 A1* | 4/2018 | Ye | H04N 19/70 |
| 2020/0280729 A1* | 9/2020 | Sun | H04N 19/186 |

* cited by examiner

*Primary Examiner* — Samuel D Fereja
(74) *Attorney, Agent, or Firm* — Bryan Cave Leighton Paisner LLP

(57) ABSTRACT

An image encoding/decoding method and apparatus are provided. An image decoding method according to the present disclosure may include: obtaining palette information and palette index prediction information of a current block from a bitstream; constructing a palette predictor for the current block based on the palette information and constructing a palette table for the current block based on the palette predictor; generating a palette index map for the current block based on the palette index prediction information; and decoding the current block based on the palette table and the palette index map, wherein the palette predictor may be initialized using a user defined palette entry obtained from at least one of an adaptation parameter set (APS), a picture parameter set (PPS) or a slice header.

10 Claims, 21 Drawing Sheets

FIG. 6

| coding_unit( x0, y0, cbWidth, cbHeight, cqtDepth, treeType, modeType ) { | Descriptor |
|---|---|
|   chType = treeType == DUAL_TREE_CHROMA? 1 : 0 | |
|   if( slice_type != I \|\| sps_ibc_enabled_flag \|\| sps_palette_enabled_flag) { | |
|     if( treeType != DUAL_TREE_CHROMA && <br>      !( ( ( cbWidth == 4 && cbHeight == 4 ) \|\| modeType == MODE_TYPE_INTRA ) <br>      && !sps_ibc_enabled_flag ) ) | |
|       cu_skip_flag[ x0 ][ y0 ] | ae(v) |
|     if( cu_skip_flag[ x0 ][ y0 ] == 0 && slice_type != I <br>      && !( cbWidth == 4 && cbHeight == 4 ) && modeType == MODE_TYPE_ALL ) | |
|       pred_mode_flag | ae(v) |
|     if( ( ( slice_type == I && cu_skip_flag[ x0 ][ y0 ] ==0 ) \|\| <br>      ( slice_type != I && ( CuPredMode[ chType ][ x0 ][ y0 ] != MODE_INTRA \|\| <br>      ( cbWidth == 4 && cbHeight == 4 && cu_skip_flag[ x0 ][ y0 ] == 0 ) ) ) ) && <br>      cbWidth <= 64 && cbHeight <= 64 && modeType != MODE_TYPE_INTER && <br>      sps_ibc_enabled_flag && treeType != DUAL_TREE_CHROMA ) | |
|       pred_mode_ibc_flag | ae(v) |
|     if( ( ( ( slice_type == I \|\| ( cbWidth == 4 && cbHeight == 4 ) \|\| sps_ibc_enabled_flag ) && <br>      CuPredMode[ x0 ][ y0 ] == MODE_INTRA ) \|\| <br>      ( slice_type != I && !( cbWidth == 4 && cbHeight == 4 ) && !sps_ibc_enabled_flag <br>      && CuPredMode[ x0 ][ y0 ] != MODE_INTRA ) ) && sps_palette_enabled_flag && <br>      cbWidth <= 64 && cbHeight <= 64 && && cu_skip_flag[ x0 ][ y0 ] == 0 && <br>      modeType != MODE_INTER ) | |
|       pred_mode_plt_flag | ae(v) |
|   } | |
|   ... | |

FIG. 7A

| palette_coding( x0, y0, cbWidth, cbHeight, startComp, numComps ) { | Descriptor |
|---|---|
|   palettePredictionFinished = 0 | |
|   NumPredictedPaletteEntries = 0 | |
|   for( predictorEntryIdx = 0; predictorEntryIdx < PredictorPaletteSize[ startComp ] && <br>    !palettePredictionFinished && <br>    NumPredictedPaletteEntries[ startComp ] < palette_max_size; predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ae(v) |
|   for( cIdx = startComp; cIdx < ( startComp + numComps); cIdx++ ) | |
|     for( i = 0; i < num_signalled_palette_entries; i++ ) | |
|       new_palette_entries[ cIdx ][ i ] | ae(v) |

FIG. 7B

| | |
|---|---|
| if( CurrentPaletteSize[ startComp ] > 0 ) | |
|    palette_escape_val_present_flag | ae(v) |
| if( MaxPaletteIndex > 0 ) { | |
|    num_palette_indices_minus1 | ae(v) |
|    adjust = 0 | |
|    for( i = 0; i <= num_palette_indices_minus1; i++ ) { | |
|      if( MaxPaletteIndex − adjust > 0 ) { | |
|        palette_idx_idc | ae(v) |
|        PaletteIndexIdc[ i ] = palette_idx_idc | |
|      } | |
|      adjust = 1 | |
|    } | |
|    copy_above_indices_for_final_run_flag | ae(v) |
|    palette_transpose_flag | ae(v) |
| } | |
| if( treeType != DUAL_TREE_CHROMA && palette_escape_val_present_flag ) { | |
|    if( cu_qp_delta_enabled_flag && !IsCuQpDeltaCoded ) { | |
|      cu_qp_delta_abs | ae(v) |
|      if( cu_qp_delta_abs ) | |
|        cu_qp_delta_sign_flag | ae(v) |
|    } | |
| } | |
| if( treeType != DUAL_TREE_LUMA && palette_escape_val_present_flag ) { | |
|    if( cu_chroma_qp_offset_enabled_flag && !IsCuChromaQpOffsetCoded ) { | |
|      cu_chroma_qp_offset_flag | ae(v) |
|      if( cu_chroma_qp_offset_flag ) | |
|        cu_chroma_qp_offset_idx | ae(v) |
|    } | |
| } | |

FIG. 7C

| | |
|---|---|
| remainingNumIndices = num_palette_indices_minus1 + 1 | |
| PaletteScanPos = 0 | |
| log2CbWidth = Log2( cbWidth ) | |
| log2CbHeight = Log2( cbHeight ) | |
| while( PaletteScanPos < cbWidth*cbHeightt ) { | |
|   xC = x0 + TraverseScanOrder[ log2CbWidth ][ log2CbHeight ][ PaletteScanPos ][ 0 ] | |
|   yC = y0 + TraverseScanOrder[ log2CbWidth ][ log2CbHeight ][ PaletteScanPos ][ 1 ] | |
|   if( PaletteScanPos > 0 ) { | |
|     xcPrev = x0 + TraverseScanOrder[ log2CbWidth ][ log2CbHeight ][ PaletteScanPos − 1 ][ 0 ] | |
|     ycPrev = y0 + TraverseScanOrder[ log2CbWidth ][ log2CbHeight ][ PaletteScanPos − 1 ][ 1 ] | |
|   } | |
|   PaletteRunMinus1 = cbWidth * cbHeight − PaletteScanPos − 1 | |
|   RunToEnd = 1 | |
|   CopyAboveIndicesFlag[ xC ][ yC ] = 0 | |
|   if( MaxPaletteIndex > 0 ) | |
|     if( ( ( !palette_transpose_flag && yC > 0 ) || ( palette_transpose_flag && xC > 0 ) ) | |
|       && CopyAboveIndicesFlag[ xcPrev ][ ycPrev ] == 0 ) | |
|       if( remainingNumIndices > 0 && PaletteScanPos < cbWidth* cbHeight − 1 ) { | |
|         copy_above_palette_indices_flag | ae(v) |
|         CopyAboveIndicesFlag[ xC ][ yC ] = copy_above_palette_indices_flag | |
|       } else { | |
|         if( PaletteScanPos == cbWidth * cbHeight − 1 && remainingNumIndices > 0 ) | |
|           CopyAboveIndicesFlag[ xC ][ yC ] = 0 | |
|         else | |
|           CopyAboveIndicesFlag[ xC ][ yC ] = 1 | |
|       } | |

FIG. 7D

| | |
|---|---|
| if ( CopyAboveIndicesFlag[ xC ][ yC ] == 0 ) { | |
|   currNumIndices = num_palette_indices_minus1 + 1 − remainingNumIndices | |
|   PaletteIndexMap[ xC ][ yC ] = PaletteIndexIdc[ currNumIndices ] | |
| } | |
| if( MaxPaletteIndex > 0 ) { | |
|   if( CopyAboveIndicesFlag[ xC ][ yC ] == 0 ) | |
|     remainingNumIndices − = 1 | |
|   if( remainingNumIndices > 0 || CopyAboveIndicesFlag[ xC ][ yC ] != | |
|     copy_above_indices_for_final_run_flag ) { | |
|     PaletteMaxRunMinus1 = cbWidth * cbHeight − PaletteScanPos − 1 − | |
|       remainingNumIndices − copy_above_indices_for_final_run_flag | |
|     RunToEnd = 0 | |
|     if( PaletteMaxRunMinus1 > 0 ) { | |
|       palette_run_prefix | ae(v) |
|       if( ( palette_run_prefix > 1 ) && ( PaletteMaxRunMinus1 != | |
|         ( 1 << ( palette_run_prefix − 1 ) ) ) ) | |
|         palette_run_suffix | ae(v) |
|     } | |
|   } | |
| } | |

FIG. 7E

| | |
|---|---|
| runPos = 0 | |
| while ( runPos <= PaletteRunMinus1 ) { | |
|    xR = x0 + TraverseScanOrder[ log2CbWidth ][ log2CbHeight ][ PaletteScanPos ][ 0 ] | |
|    yR = y0 + TraverseScanOrder[ log2CbWidth ][ log2CbHeight ][ PaletteScanPos ][ 1 ] | |
|    if( CopyAboveIndicesFlag[ xC ][ yC ] == 0 ) { | |
|      CopyAboveIndicesFlag[ xR ][ yR ] = 0 | |
|      PaletteIndexMap[ xR ][ yR ] = PaletteIndexMap[ xC ][ yC ] | |
|    } else { | |
|      CopyAboveIndicesFlag[ xR ][ yR ] = 1 | |
|      if( !palette_transpose_flag ) | |
|        PaletteIndexMap[ xR ][ yR ] = PaletteIndexMap[ xR ][ yR − 1 ] | |
|      else | |
|        PaletteIndexMap[ xR ][ yR ] = PaletteIndexMap[ xR − 1 ][ yR ] | |
|    } | |
|    runPos++ | |
|    PaletteScanPos ++ | |
|    } | |
| } | |
| if( palette_escape_val_present_flag ) { | |
|    for( cIdx = startComp; cIdx < ( startComp + numComps ); cIdx++ ) | |
|      for( sPos = 0; sPos < cbWidth* cbHeight; sPos++ ) { | |
|        xC = x0 + TraverseScanOrder[ log2CbWidth ][ log2CbHeight ][ sPos ][ 0 ] | |
|        yC = y0 + TraverseScanOrder[ log2CbWidth ][ log2CbHeight ][ sPos ][ 1 ] | |
|        if( PaletteIndexMap[ cIdx ][ xC ][ yC ] == MaxPaletteIndex ) { | |
|          palette_escape_val | ae(v) |
|          PaletteEscapeVal[ cIdx ][ xC ][ yC ] = palette_escape_val | |
|        } | |
|       } | |
|    } | |
| } | |

FIG. 10

| adaptation_parameter_set_rbsp() { | Descriptor |
|---|---|
|   adaptation_parameter_set_id | u(5) |
|   aps_params_type | u(3) |
|   if( aps_params_type == ALF_APS ) | |
|     alf_data( ) | |
|   else if( aps_params_type == LMCS_APS ) | |
|     lmcs_data( ) | |
|   else if( aps_params_type == SCALING_APS ) | |
|     scaling_list_data( ) | |
|   else if ( aps_params_type == PLT_APS ) | |
|     plt_entries_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

FIG. 11

| plt_entries_data( ) { | Descriptor |
|---|---|
|   num_predictor_plt_entries_minus1 | ae(v) |
|   for(compId = 0; compId < 3; compId++) { | |
|     for( i = 0; i <= num_predictor_plt_entries_minus1; i ++) { | |
|       plt_predictor_plt_entries[compId][i] | ae(v) |
|     } | |
|   } | |
| } | |

FIG. 12

| slice_header( ) { | Descriptor |
|---|---|
|   if(sps_palette_enabled_flag) { | |
|     slice_palette_enabled_flag | u(1) |
|     if( slice_palette_enabled_flag ) { | |
|       slice_palette_aps_id | u(3) |
|     } | |
|   } | |
| } | |

FIG. 13

Initialization process

Outputs of this process are initialized CABAC internal variables.

The context variables of the arithmetic decoding engine are initialized as follows:

- If the CTU is the first CTU in a brick, the initialization process for context variables is invoked as specified in clause 9.3.2.2 and the initialization process for palette is invoked as specified in clause 9.3.2.X.

- Otherwise, if entropy_coding_sync_enabled_flag is equal to 1 and either CtbAddrInRs % PicWidthInCtbsY is equal to 0 or BrickId[ CtbAddrInBs ] is not equal to BrickId[ CtbAddrRsToBs[ CtbAddrInRs − 1 ] ], the following applies:

- The location ( xNbT, yNbT ) of the top-left luma sample of the spatial neighbouring block T is derived using the location ( x0, y0 ) of the top-left luma sample of the current CTB as follows:

( xNbT, yNbT ) = ( x0, y0 − CtbSizeY )

- The derivation process for neighbouring block availability as specified in clause 6.4.4 is invoked with the location ( xCurr, yCurr ) set equal to ( x0, y0 ), the neighbouring location ( xNbY, yNbY ) set equal to ( xNbT, yNbT ), checkPredModeY set equal to FALSE, and cIdx set equal to 0 as inputs, and the output is assigned to availableFlagT.

- The synchronization process for context variables is invoked as follows:

- If availableFlagT is equal to 1, the synchronization process for context variables as specified in clause 9.3.2.4 is invoked with TableStateIdx0Wpp, TableStateIdx1Wpp, TableMpsValWpp as inputs.

- Otherwise, the initialization process for context variables is invoked as specified in clause 9.3.2.2

The initialization process for palette is invoked as specified in clause 9.3.2.X.

- Otherwise, the initialization process for context variables is invoked as specified in clause 9.3.2.2 and the variable PredictorPaletteSize is initialized to 0. [Ed. (YK): Check whether this can be merged with the condition "If the CTU is the first CTU in a brick", as the operation is the same. This is also the case in HEVC.]

Initialization process for palette

Outputs of this process are the initialized palette predictor variables PredictorPaletteSize and PredictorPaletteEntries.

The variable plt_predictor_plt_entry[cIdx][i] is derived from APS with slice_palette_aps_id inclusive, and the variable PredictorPaletteSize[cIdx] is set equal num_predictor_plt_entries_minus1 plus 1 that is signaled at APS with slice_palette_aps_id inclusive The array PredictorPaletteEntries are derived or modified as follows:

```
for( cIdx = 0; cIdx < 3; cIdx++ )
   for( i = 0; i < PredictorPaletteSize[cIdx]; i++ ) {
      PredictorPaletteEntries[ cIdx ][ i ] = plt_predictor_plt_entry[ cIdx ][ i ]
      PredictorPaletteSize[ cIdx ] = num_predictor_plt_entries_minus1 + 1
   }
```

It is a requirement of bitstream conformance that the value of PredictorPaletteSize[cIdx] shall be in the range of 0 to PaletteMaxPredictorSize, inclusive.

FIG. 14

| slice_header( ) { | Descriptor |
|---|---|
| if(sps_palette_enabled_flag) { | |
|   slice_palette_enabled_flag | u(1) |
|   if( slice_palette_enabled_flag ) { | |
|     slice_palette_aps_id_luma | u(3) |
|     if(qtbtt_dual_tree_intra_flag) | |
|       slice_palette_aps_id_chroma | u(3) |
|     } | |
|   } | |
| } | |

FIG. 15

Initialization process

Outputs of this process are initialized CABAC internal variables.

The context variables of the arithmetic decoding engine are initialized as follows:

- If the CTU is the first CTU in a brick, the initialization process for context variables is invoked as specified in clause 9.3.2.2 and the initialization process for palette is invoked as specified in clause 9.3.2.X.

- Otherwise, if entropy_coding_sync_enabled_flag is equal to 1 and either CtbAddrInRs % PicWidthInCtbsY is equal to 0 or BrickId[ CtbAddrInBs ] is not equal to BrickId[ CtbAddrRsToBs[ CtbAddrInRs − 1 ] ], the following applies:

- The location ( xNbT, yNbT ) of the top-left luma sample of the spatial neighbouring block T is derived using the location ( x0, y0 ) of the top-left luma sample of the current CTB as follows:

( xNbT, yNbT ) = ( x0, y0 − CtbSizeY )

- The derivation process for neighbouring block availability as specified in clause 6.4.4 is invoked with the location ( xCurr, yCurr ) set equal to ( x0, y0 ), the neighbouring location ( xNbY, yNbY ) set equal to ( xNbT, yNbT ), checkPredModeY set equal to FALSE, and cIdx set equal to 0 as inputs, and the output is assigned to availableFlagT.

- The synchronization process for context variables is invoked as follows:

- If availableFlagT is equal to 1, the synchronization process for context variables as specified in clause 9.3.2.4 is invoked with TableStateIdx0Wpp, TableStateIdx1Wpp, TableMpsValWpp as inputs.

- Otherwise, the initialization process for context variables is invoked as specified in clause 9.3.2.2

The initialization process for palette is invoked as specified in clause 9.3.2.X.

- Otherwise, the initialization process for context variables is invoked as specified in clause 9.3.2.2 and the variable PredictorPaletteSize is initialized to 0. [Ed. (YK): Check whether this can be merged with the condition "If the CTU is the first CTU in a brick", as the operation is the same. This is also the case in HEVC.]

Initialization process for palette

Outputs of this process are the initialized palette predictor variables PredictorPaletteSize and PredictorPaletteEntries.

The variable plt_predictor_plt_entry[0][i] is derived from APS with slice_palette_aps_id_luma inclusive, and the variable plt_predictor_plt_entry[1][i], plt_predictor_plt_entry[2][i] and is derived from APS with slice_palette_aps_id_chroma inclusive.

The variable numPredictorPltEntriesLuma is set equal to (num_predictor_plt_entries_minus1 + 1) form APS with slice_palette_aps_id_luma inclusive, and numPredictorPltEntriesChroma is set equal to (num_predictor_plt_entries_minus1 + 1) from APS with slice_palette_aps_id_chroma inclusive.

The variable PredictorPaletteSize[cIdx] and the array PredictorPaletteEntries are derived or modified as follows:

```
for( i = 0; i < numPredictorPltEntriesLuma; i++ )
    PredictorPaletteEntries[ cIdx ][ i ] = plt_predictor_plt_entry[ cIdx ][ i ]

for( cIdx = 1; cIdx < 3; cIdx++ )
   for( i = 0; i < numPredictorPltEntriesChroma; i++ ) {
        PredictorPaletteEntries[ cIdx ][ i ] = plt_predictor_plt_entry[ cIdx ][ i ]

}
```

It is a requirement of bitstream conformance that the value of PredictorPaletteSize[cIdx] shall be in the range of 0 to PaletteMaxPredictorSize, inclusive.

FIG. 16

| | |
|---|---|
| if( chroma_format_idc == 3 ) | |
|   sps_palette_enabled_flag | u(1) |
|   if(sps_palette_enabled_flag) { | |
|     sps_max_palette_size | u(e) |
|     sps_max_palette_predictor_delta_size | |
|   } | |

FIG. 17

| seq_parameter_set_rbsp( ) { | Descriptor |
|---|---|
|   input_bit_depth_luma_minus8 | ue(v) |
|   input_bit_depth_chroma_minus8 | ue(v) |

FIG. 18

| plt_entries_data( ) { | Descriptor |
|---|---|
|   plt_entry_bit_depth_minus8 | ae(v) |
|   num_predictor_plt_entries_minus1 | ae(v) |
|   for(compId = 0; compId < 3; compId++) { | |
|     for( i = 0; i <= num_predictor_plt_entries_minus1; i ++) { | |
|       plt_predictor_plt_entries[compId][i] | ae(v) |
|     } | |
|   } | |
| } | |

FIG. 19

| slice_header( ) { | Descriptor |
|---|---|
|   if(sps_palette_enabled_flag) { | |
|     slice_palette_aps_id_present_flag | u(1) |
|     if(slice_palette_aps_id_present_flag) { | |
|       slice_palette_aps_id | u(3) |
|     } | |
|   } | |
| } | |

FIG. 20

| slice_header( ) { | Descriptor |
|---|---|
|   if(sps_palette_enabled_flag) { | |
|     slice_palette_aps_id_present_flag | u(1) |
|     if(slice_palette_aps_id_present_flag) { | |
|       slice_palette_aps_id_luma | u(3) |
|       if(qtbtt_dual_tree_intra_flag) | |
|         slice_palette_aps_id_chroma | u(3) |
|     } | |
|   } | |

FIG. 21

| palette_entry_data( ) { | Descriptor |
|---|---|
|   palette_entry_bit_depth_luma_minus8 | ue(v) |
|   palette_entry_bit_depth_chroma_minus8 | ue(v) |
|   num_signalled_palette_entry_minus1 | ue(v) |
|   for( cIdx = 0; cIdx < 3; cIdx++ ) | |
|     for( i = 0; i <= num_signalled_palette_entries_minus1; i++ ) | |
|       initial_predictor_palette_entries[ cIdx ][ i ] | ue(v) |
| } | |

FIG. 22

| slice_header( ) { | Descriptor |
|---|---|
|   slice_pic_parameter_set_id | ue(v) |
|   ... | |
|   if( sps_palette_enabled_flag ) { | |
|     slice_palette_enabled_flag | u(1) |
|     slice_palette_entries_present_flag | u(1) |
|     if( slice_palette_entries_present_flag ) | |
|       slice_palette_entries_aps_id | u(2) |
|   } | |
|   ... | |
| } | |

Initialization process

Outputs of this process are initialized CABAC internal variables.

The context variables of the arithmetic decoding engine are initialized as follows:

– If the CTU is the first CTU in a brick, the initialization process for context variables is invoked as specified in clause 9.3.2.2 and the initialization process for palette is invoked as specified in clause 9.3.2.X.

– Otherwise, if entropy_coding_sync_enabled_flag is equal to 1 and either CtbAddrInRs % PicWidthInCtbsY is equal to 0 or BrickId[ CtbAddrInBs ] is not equal to BrickId[ CtbAddrRsToBs[ CtbAddrInRs − 1 ] ], the following applies:

– The location ( xNbT, yNbT ) of the top-left luma sample of the spatial neighbouring block T is derived using the location ( x0, y0 ) of the top-left luma sample of the current CTB as follows:

( xNbT, yNbT ) = ( x0, y0 − CtbSizeY )

– The derivation process for neighbouring block availability as specified in clause 6.4.4 is invoked with the location ( xCurr, yCurr ) set equal to ( x0, y0 ), the neighbouring location ( xNbY, yNbY ) set equal to ( xNbT, yNbT ), checkPredModeY set equal to FALSE, and cIdx set equal to 0 as inputs, and the output is assigned to availableFlagT.

– The synchronization process for context variables is invoked as follows:

– If availableFlagT is equal to 1, the synchronization process for context variables as specified in clause 9.3.2.4 is invoked with TableStateIdx0Wpp, TableStateIdx1Wpp, TableMpsValWpp as inputs.

– Otherwise, the initialization process for context variables is invoked as specified in clause 9.3.2.2

The initialization process for palette is invoked as specified in clause 9.3.2.X.

– Otherwise, the initialization process for context variables is invoked as specified in clause 9.3.2.2 and the variable PredictorPaletteSize is initialized to 0. [Ed. (YK): Check whether this can be merged with the condition "If the CTU is the first CTU in a brick", as the operation is the same. This is also the case in HEVC.]

Initialization process for palette

Outputs of this process are the initialized palette predictor variables PredictorPaletteSize and PredictorPaletteEntries.

The variable plt_predictor_plt_entry[cIdx][i] is derived from APS with slice_palette_aps_id inclusive, and the variable PredictorPaletteSize[cIdx] is set equal num_predictor_plt_entries_minus1 plus 1 that is signaled at APS with slice_palette_aps_id inclusive The array PredictorPaletteEntries and the PredictorPaletteSize is derived or modified as follows:

- If the slice_palette_entries_present_flag is equal to 1, the following applies:

For the luma component palette predictor, The variable shiftBitDepthy is set equal to (BitDepth$_Y$ − pltBitDepth$_Y$ )

```
for( i = 0; i < PredictorPaletteSize[0]; i++ ) {
    PredictorPaletteEntries[ 0 ][ i ] = initial_predictor_palette_entries[ 0 ][ i ] << shiftBitDepthy
    PredictorPaletteSize[ 0 ] = num_signalled_palette_entry_minus1 + 1
}
```

For the chroma component palette predictor, The variable shiftBitDepthc is set equal to (BitDepthc − PltBitDepthc )

```
for( cIdx = 1; cIdx < 3; cIdx++ )
    for( i = 0; i < PredictorPaletteSize[cIdx]; i++ ) {
        PredictorPaletteEntries[ cIdx ][ i ]  =  initial_predictor_palette_entries[ cIdx ][ i ]  <<  shiftBitDepthc
        PredictorPaletteSize[ cIdx ] = num_signalled_palette_entry_minus1 + 1
    }
```

- Otherwise,

```
for( cIdx = 0; cIdx < 3; cIdx++ )
    for( i = 0; i < PredictorPaletteSize[ cIdx ]; i++ ) {
        PredictorPaletteEntries[ cIdx ][ i ] = 0
        PredictorPaletteSize[ cIdx ] = 0
    }
```

It is a requirement of bitstream conformance that the value of PredictorPaletteSize[cIdx] shall be in the range of 0 to PaletteMaxPredictorSize, inclusive.

FIG. 24

| seq_parameter_set_rbsp( ) { | Descriptor |
|---|---|
| ... | |
| if(sps_palette_enabled_flag) { | |
|    sps_palette_entries_present_flag | u(1) |
|    if(sps_palette_entries_present_flag) { | |
|      palette_entry_data( ) | |
|    } | |
| } | |
| ... | |
| } | |

FIG. 25

| pic_parameter_set_rbsp( ) { | Descriptor |
|---|---|
| ... | |
| if(sps_palette_enabled_flag) { | |
|    pps_palette_entries_present_flag | u(1) |
|    if(pps_palette_entries_present_flag) { | |
|      palette_entry_data( ) | |
|    } | |
| } | |
| ... | |
| } | |

FIG. 26

| slice_header( ) { | Descriptor |
|---|---|
| ... | |
| if(sps_palette_enabled_flag) { | |
|    slice_palette_enabled_flag | u(1) |
|    slice_palette_entries_present_flag | u(1) |
|    if(slice_palette_entries_present_flag) { | |
|      palette_entry_data( ) | |
|    } | |
| } | |
| ... | |
| } | |

IMAGE ENCODING/DECODING METHOD AND APPARATUS USING USER-DEFINED PALETTE ENTRY, AND METHOD FOR TRANSMITTING BITSTREAM

CROSS-REFERENCE TO RELATED APPLICATIONS

This application is a Continuation of U.S. patent application Ser. No. 17/763,054, filed on Mar. 23, 2022, which is a National Stage filing under 35 U.S.C. 371 of International Application No. PCT/KR2020/012900, with an international filing date of Sep. 23, 2020, which claims the benefit of U.S. Provisional Application No. 62/911,961, filed on Oct. 7, 2019, U.S. Provisional Application No. 62/905,413, filed on Sep. 25, 2019, U.S. Provisional Application No. 62/904,557, filed on Sep. 23, 2019, all of which are incorporated by reference in their entirety herein.

TECHNICAL FIELD

The present disclosure related to an image encoding/decoding method and apparatus and a method for transmitting a bitstream, and more particularly, to an image encoding/decoding method and apparatus using user defined palette entries and a method for transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

In addition, an object of the present disclosure is to provide an image encoding/decoding method and apparatus using user defined palette entries.

In addition, an object of the present disclosure is to provide an image encoding/decoding method and apparatus signaling user defined palette entries through a high level syntax.

In addition, an object of the present disclosure is to provide an image encoding/decoding method and apparatus initializing a palette predictor using a user defined palette entry.

In addition, an object of the present disclosure is to provide a method for transmitting a bitstream generated by an image encoding method or apparatus according to the present disclosure.

In addition, an object of the present disclosure is to provide a recording medium storing a bitstream generated by an image encoding method or apparatus according to the present disclosure.

In addition, an object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may include: obtaining palette information and palette index prediction information of a current block from a bitstream; constructing a palette predictor for the current block based on the palette information and constructing a palette table for the current block based on the palette predictor; generating a palette index map for the current block based on the palette index prediction information; and decoding the current block based on the palette table and the palette index map, wherein the palette predictor may be initialized using a user defined palette entry obtained from at least one of an adaptation parameter set (APS), a picture parameter set (PPS) or a slice header.

An image decoding apparatus according to another aspect of the present disclosure may include a memory and at least one processor, wherein the at least one processor may be configured to obtain palette information and palette index prediction information of a current block from a bitstream, to construct a palette predictor for the current block based on the palette information and construct a palette table for the current block based on the palette predictor, to generate a palette index map for the current block based on the palette index prediction information, and to decode the current block based on the palette table and the palette index map, and wherein the palette predictor may be initialized using a user defined palette entry obtained from at least one of an adaptation parameter set (APS), a picture parameter set (PPS) or a slice header.

An image encoding method according to yet another aspect of the present disclosure may include: constructing a palette predictor for a current block and constructing a palette table for the current block based on the palette predictor; generating a palette index map for the current block based on the palette table; and encoding the current block based on the palette index map, wherein the palette predictor may be initialized using at least one user defined palette entry, and the palette predictor may be signaled through at least one of an adaptation parameter set (APS), a picture parameter set (PPS) or a slice header.

A transmission method according to yet another aspect of the present disclosure may transmit a bitstream generated by the image encoding apparatus or the image encoding method of the present disclosure.

A computer-readable recording medium according to yet another aspect of the present disclosure may store a bitstream generated by the image encoding method or the image encoding apparatus of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

In addition, according to the present disclosure, it is possible to provide an image encoding/decoding method and apparatus which single a user defined palette entry through a high level syntax.

In addition, according to the present disclosure, it is possible to provide an image encoding/decoding method and apparatus which initialize a palette predictor using a user defined palette entry.

In addition, according to the present disclosure, it is possible to provide a method for transmitting a bitstream generated by an image encoding method or apparatus according to the present disclosure.

In addition, according to the present disclosure, it is possible to provide a recording medium storing a bitstream generated by an image encoding method or apparatus according to the present disclosure.

In addition, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 6 is a view illustrating some of coding_unit syntax for a palette mode.

FIGS. 7A to 7E are views illustrating palette_coding syntax for a palette mode.

FIG. 10 is a view illustrating an example of an APS for signaling a user defined palette entry.

FIG. 11 is a view illustrating an example of a palette entry function.

FIG. 12 is a view illustrating an example of a slice header syntax for initializing a palette predictor.

FIG. 13 is a view illustrating an example of a process of initializing a palette predictor.

FIG. 14 is a view illustrating another example of a slice header syntax for initializing a palette predictor.

FIG. 15 is a view illustrating another example of a process of initializing a palette predictor.

FIG. 16 is a view illustrating an example of a syntax for setting the maximum size of a palette table and of a palette predictor.

FIG. 17 is a view illustrating an example of SPS for signaling an input bit depth of a user defined palette entry.

FIG. 18 is a view illustrating another example of a palette entry function.

FIG. 19 is a view illustrating yet another example of a slice header syntax for initializing a palette predictor.

FIG. 20 is a view illustrating yet another example of a slice header syntax for initializing a palette predictor.

FIG. 21 is a view illustrating yet another example of a palette entry function.

FIG. 22 is a view illustrating yet another example of a slice header syntax for initializing a palette predictor.

FIG. 23A and FIG. 23B are views illustrating yet another example of a process of initializing a palette predictor.

FIG. 24 is a view illustrating an example of a SPS for initializing a palette predictor.

FIG. 25 is a view illustrating an example of a PPS for initializing a palette predictor.

FIG. 26 is a view illustrating yet another example of a slice header syntax for initializing a palette predictor.

MODE FOR INVENTION

Figure 1:
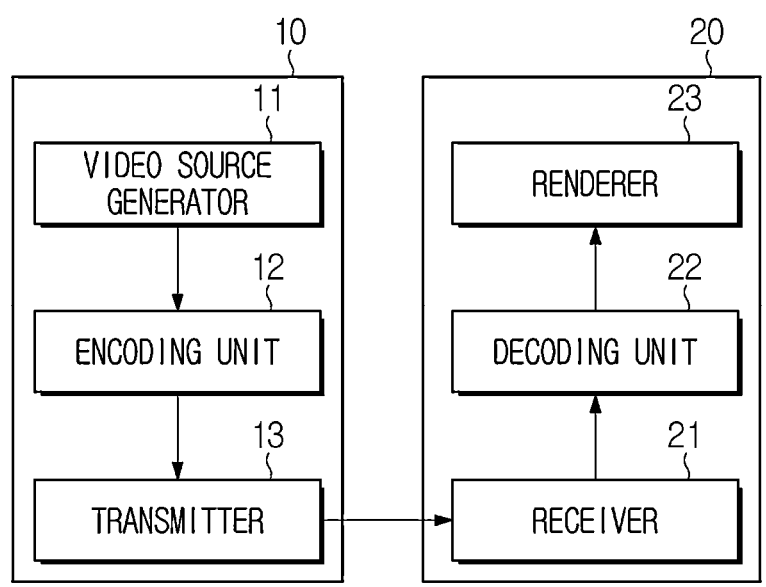
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The chroma component block of the current block may be expressed by including an explicit description of a luma component block, such as "luma block" or "current luma block". In addition, the chroma component block of the current block may be explicitly expressed by including an explicit description of the chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
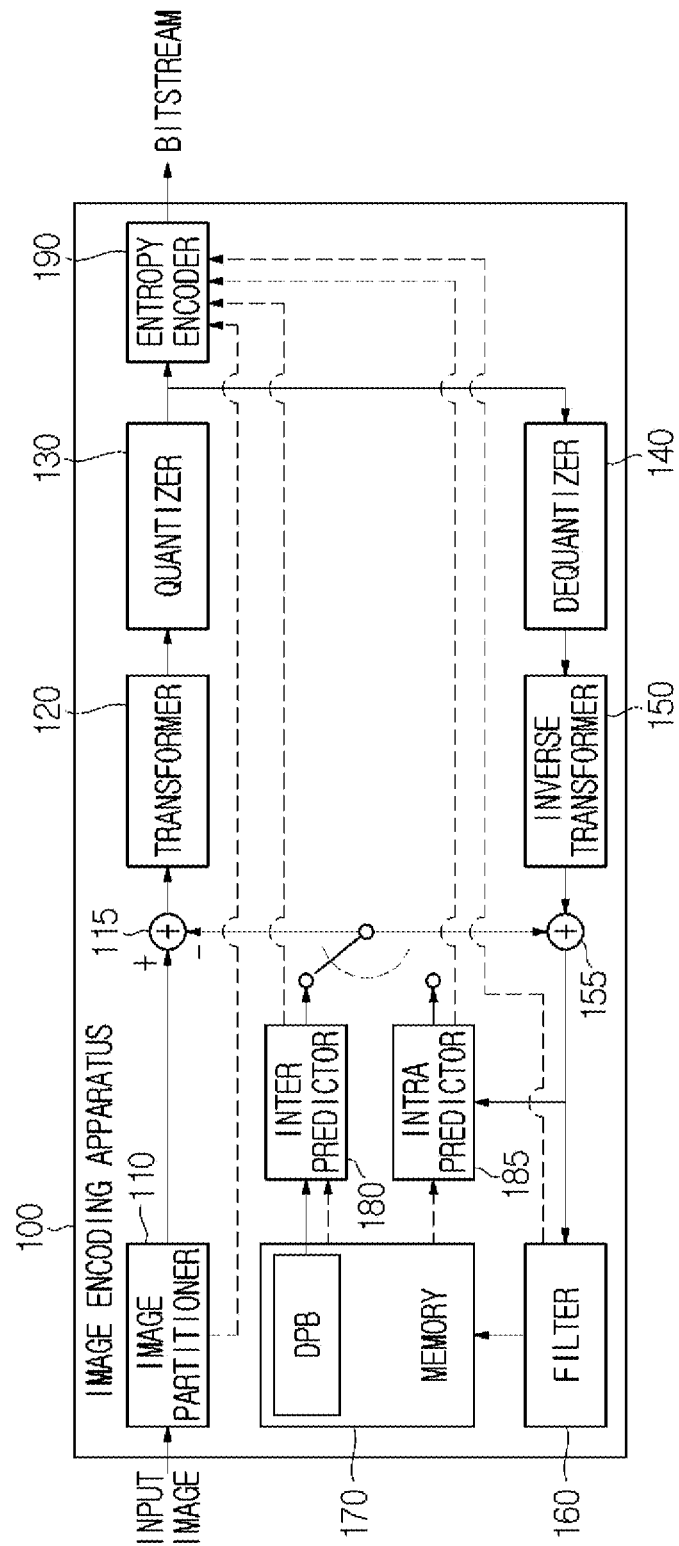
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector)

corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
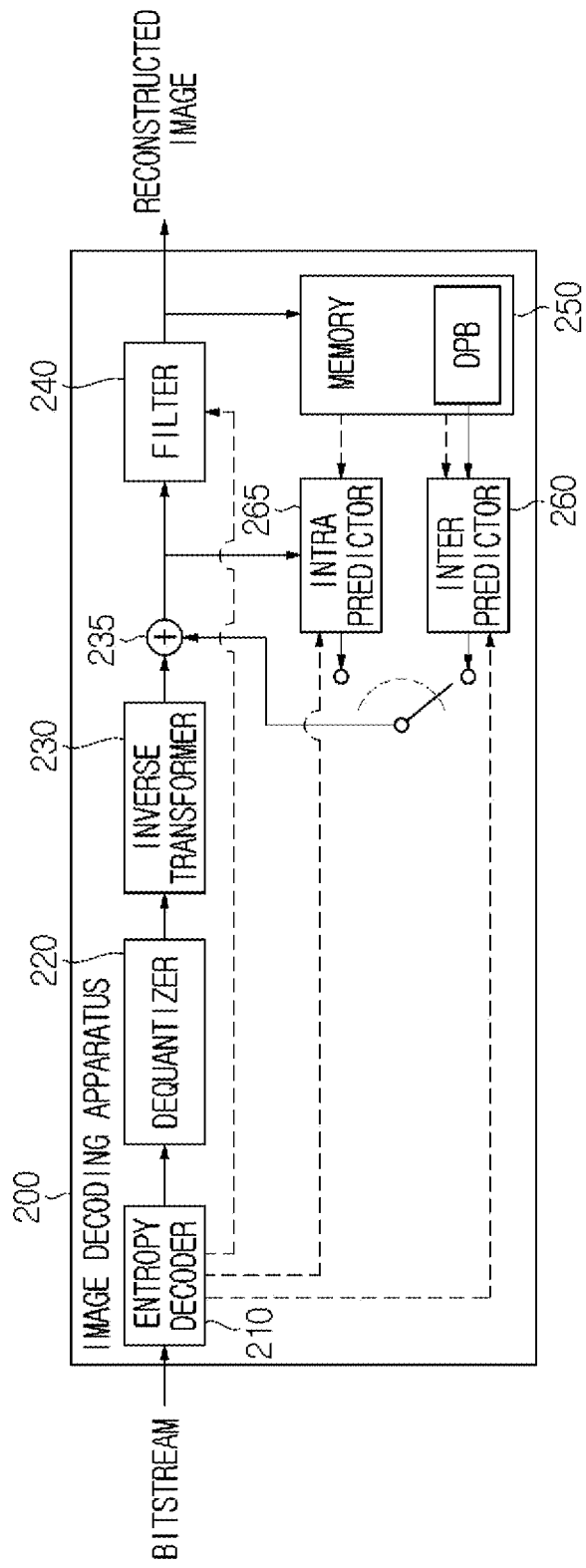
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Hereinafter, a palette mode will be described.

Overview of Palette Mode

A palette mode may represent a prediction mode in which a current block is encoded/decoded based on a palette (or palette table) including a predetermined representative color value set. In the palette mode, each sample in the current block may be expressed as a palette index specifying a predetermined representative color value. In the present disclosure, encoding/decoding using a palette mode may be referred to as palette encoding/decoding.

The palette mode may be used to improve encoding/decoding efficiency of a specific image. For example, screen content, which is an image including a significant amount of text and graphics generated by an electronic apparatus such as a computer or a smartphone, includes a local area separated by a sharp edge, and the local area may be expressed with a relatively small number of colors. Accordingly, the palette mode in which most pixel values in the current block is expressed with a relatively small number indices may be more effective in encoding/decoding of screen content compared to other prediction modes (e.g., intra prediction mode, inter prediction mode, etc.)

The palette mode is one of the above-described intra prediction modes and may be called a palette encoding mode, an intra palette mode, an intra palette encoding mode, etc. However, when the palette mode applies to the current block, unlike the intra prediction mode, a residual value for the current block may not be separately signaled. In this regard, the palette mode may be similar to the above-described skip mode.

When the current block has a single tree structure, the palette mode may apply to both the luma component and chroma component of the current block. For example, when the palette mode applies to the luma component of the current block having the single tree structure, the palette mode may apply to the chroma component of the current block. In contrast, when the current block has a dual tree structure, the palette mode may individually apply to the luma component and chroma component of the current block. For example, when the palette mode applies to the luma component of the current block having the dual tree structure, the palette mode may apply to the chroma component of the current block or one of other prediction modes (e.g., intra prediction mode, inter prediction mode, etc.) may apply.

When the palette mode applies to the current block, a palette table for the current block may be constructed based on a palette predictor.

The palette predictor may include one or more palette entries (representative color values) and one or more palette indices for identifying the palette entries. In an example, the palette predictor may be initialized to a predetermined value (e.g., 0) at the first encoding/decoding time of a CTU (or slice) including the current block. In addition, the palette predictor may be updated using at least one palette entry used for palette encoding/decoding. In an embodiment, until the size of the palette predictor reaches a predetermined maximum size (that is, until the palette predictor includes a maximum allowed number of palette entries), a palette entry of a previous palette predictor which is not included in a current palette table may be added to a last position (index) of the palette predictor for next palette encoding. This may be referred to as palette stuffing.

The palette table may include at least one palette entry included in the palette predictor and at least one palette index for identifying the palette entry. For each palette entry included in the palette predictor, a reuse flag specifying whether the palette entry is included in the palette table may be signaled through a bitstream. In this case, the reuse flag having a first value (e.g., 0) may specify that the palette entry is not included in the palette table. In contrast, the reuse flag having a second value (e.g., 1) may specify that the corresponding palette entry is included in the palette table. The reuse flag may be encoded, for example, using run-length coding for a value of 0.

In addition, the palette table may include at least one new palette entry which is not included in the palette predictor and at least one palette index for identifying the new palette entry. Information (e.g., a total number, a component value, etc.) on the new palette entry may be encoded, for example, using a 0-th exponential Golomb code and signaled through a bitstream.

Based on the palette table, a palette index map for the current block to be encoded may be generated. Specifically, based on similarity between a pixel value of each of a plurality of samples in the current block and a representative color value, by mapping a predetermined palette index in the palette table to each of the plurality of samples, the palette index map for the current block may be generated. In this case, an escape palette index may be mapped to a sample (escape sample) having a pixel which is not similar to the representative color value (palette entry) defined in the palette table among the plurality of samples in the current block. The escape palette index may specify an escape sample (escape symbol) and may have the largest value within the palette table. In an example, whether the current block includes an escape sample may be signaled using an escape sample flag (e.g., palette_escape_val_present_flag). For example, palette_escape_val_present_flag having a first value (e.g., 0) may specify that the current block does not include the escape sample. In contrast, palette_escape_val_present_flag having a second value (e.g., 1) may specify that the current block includes the escape sample.

Palette index prediction information of the palette index map may be signaled through a bitstream. The palette index prediction information may include at least one palette index mapped to the current block and run-value information of the palette index. The run-value of the palette index may specify a value obtained by subtracting 1 from the number of palette indices continuously mapped to the current block as the same value. For example, when the current block includes first to fourth samples continuously present in a predetermined scan direction (e.g., horizontal direction), a first palette index (e.g., 0) is mapped to each of the first to third samples and a second palette index (e.g., 1) is mapped to the fourth sample, the run-value of the first palette index may be 2, and the run-value of the second palette index may be 0. When the current block includes the escape sample (escape symbol) (e.g., palette_escape_val_present_flag=1), the palette index prediction information may include run-value information of the escape palette index mapped to the escape sample.

Based on the palette index prediction information, a palette index map for the current block to be encoded may be generated. For example, by mapping each of one or more palette indices obtained from the palette index prediction information to each of the plurality of samples in the current block, the palette index map for the current block may be generated. In an example, based on a last palette index (in mapping order) among one or more palette indices obtained from the palette index prediction information, the value of each of the one or more palette indices may be adjusted. For example, when the last palette index obtained from the palette index prediction information is an escape palette index, palette entries obtained from the palette index prediction information may be mapped to the current block as a value increasing by a predetermined size (e.g., 1).

The current block may be encoded/decoded based on the palette index map. For a sample having a pixel value equal or similar to the representative color value defined in the palette table among the plurality of samples in the current block, the value of the palette index specifying the corresponding representative color value may be signaled through a bitstream. In contrast, for a sample having a pixel value which is not similar to the representative color value defined in the palette table among the plurality of samples in the current block, a quantized pixel value of the corresponding sample may be directly signaled through a bitstream.

In order to encode palette indices mapped to the current bock, the palette index map may be scanned using a predetermined scan method. In addition, in order to construct palette index map using the palette indices obtained from the bitstream, the current block may be scanned using the predetermined scan method.

Figure 4:
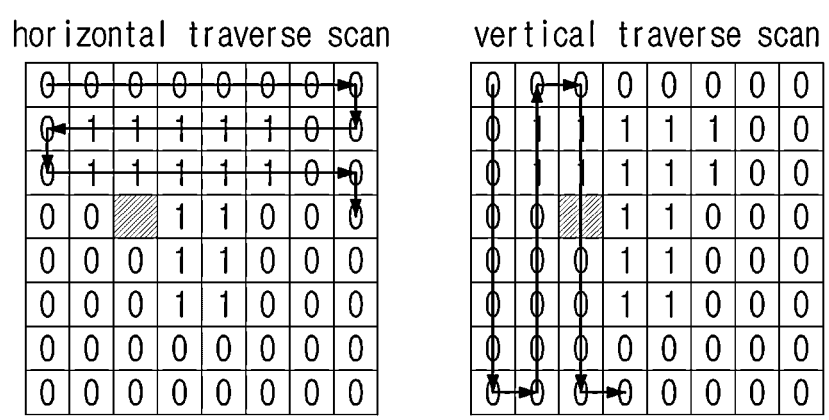
FIG. 4 is a view illustrating an example of a scan method which may be used in a palette mode.

FIG. 4 is a view illustrating an example of a scan method which may be used in a palette mode.

Referring to FIG. 4, the scan method which may be used in the palette mode may include horizontal traverse scan and vertical traverse scan. The horizontal traverse scan may mean a method in which an odd-numbered row of the current block (or palette index map) is scanned from left to right and an even-numbered row of the current block is scanned from right to left. In addition, the vertical traverse scan may mean a method in which an odd-numbered column of the current block is scanned from top to bottom and an even-numbered column of the current block is scanned from bottom to top.

Information on the scan method which may be used in the palette mode may be signaled using a predetermined flag (e.g., palette_transpose_flag). For example, when the horizontal traverse scan is used for palette encoding of the current block, palette_transpose_flag having a first value (e.g., 0) may be signaled through a bitstream. In contrast, when the vertical traverse scan is used for palette encoding of the current block, palette_transpose_flag having a second value (e.g., 1) may be signaled through a bitstream.

Palette indices mapped to each sample in the current block may be encoded using an 'INDEX' mode and a 'COPY_ABOVE' mode. In the present disclosure, the 'INDEX' mode and the 'COPY_ABOVE' mode may be referred to as a palette sample mode.

Except for the topmost row of the current block in the horizontal traverse scan, the leftmost column of the current block in the vertical traverse scan and the case where an immediately previous palette sample mode is 'COPY_ABOVE', information on the palette sample mode may be signaled using a predetermined flag (e.g., copy_above_palette_indices_flag). For example, copy_above_palette_indices_flag having a first value (e.g., 0) may specify that the predetermined palette index mapped to the current block is encoded using the 'INDEX' mode. In contrast, copy_above_palette_indices_flag having a second value (e.g., 1) may specify that the predetermined palette index mapped to the current block is encoded using the 'COPY_ABOVE' mode.

In the 'INDEX' mode, the value of the palette index may be explicitly signaled through a bitstream. In the 'INDEX' mode and the 'COPY_ABOVE' mode, run-value information specifying the number of samples continuously encoded using the same palette sample mode may be signaled through a bitstream.

The palette indices included in the palette index map may be encoded in the following order.

First, the number of palette indices mapped to the current block (or current CU) may be signaled. Next, the value of each of the palette indices may be signaled using fixed length coding. In an example, the number of palette indices and the value of each of palette indices may be encoded using a bypass mode. Through this, bypass bins related to the palette index may be grouped. In addition, information (e.g., copy_above_palette_indices_flag) on the palette sample mode and the run-value information of the palette sample mode may be signaled in an interleaving manner. Finally, component escape values corresponding to the escape samples in the current block may be grouped and encoded in the bypass mode. In an example, after signaling the value of each of the palette indices, at least one additional syntax element (e.g., last_run_type_flag) may be additionally signaled. In this case, based on the number of palette indices and the additional syntax element, signaling of a run-value corresponding to last run in the current block may be skipped.

Figure 5:
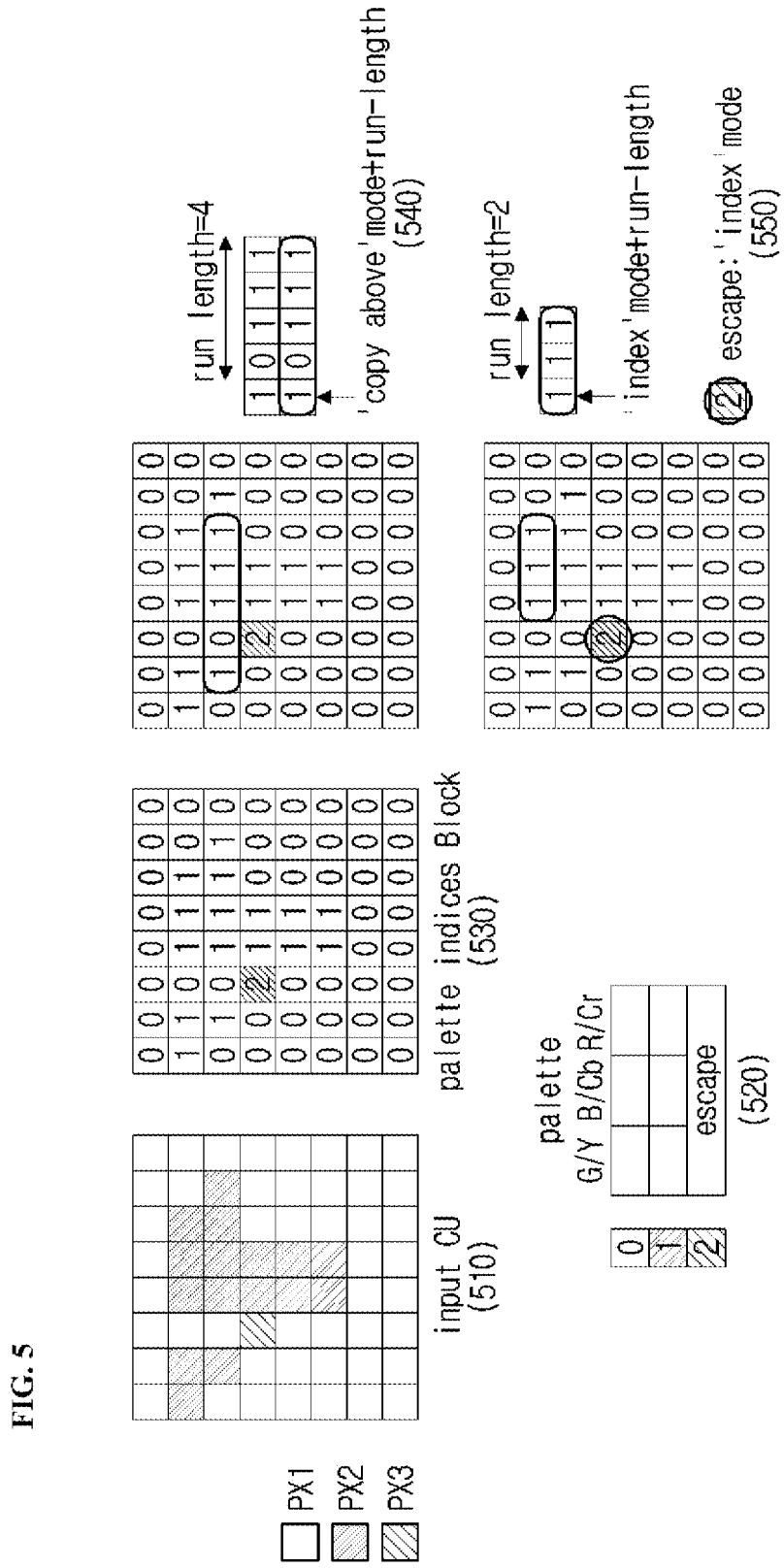
FIG. 5 is a view for describing a palette encoding process of a current block.

FIG. 5 is a view for describing a palette encoding process of a current block.

Referring to FIG. 5, a plurality of pixels (samples) in a current block may be expressed using a total of three color values (510). For example, first pixels PX1 may have a first color value, second pixels PX2 may have a second color value and third pixels PX3 may have a third color value.

When the palette mode applies to the current block, a palette table for the current block may be constructed (520). The palette table may include palette entries (representative color value) for each color component (e.g., (G, B, R), (Y, Cb, Cr), etc.) and a palette index (e.g., 0, 1) for identifying each palette entry. In addition, the palette table may further include an escape palette index (e.g., 2). The escape palette index may be mapped to an escape sample (or escape symbol) having a pixel value which is not similar to the representative color value defined in the palette table among the plurality of pixels in the current block. For the escape sample to which the escape palette index is mapped, a quantized pixel value of the escape sample may be signaled.

Based on similarity between the pixel value of each of the plurality of samples in the current block and the representative color value, by mapping a predetermined palette index in the palette table to each of the plurality of samples, a palette index map for the current block may be generated (530). For example, a first palette index (e.g., 0) may be mapped to each of first pixels PX1, a second palette index (e.g., 1) may be mapped to each of the second pixels PX2, and an escape palette index (e.g., 2) may be mapped to a third pixel PX3 which is an escape sample, thereby generating the palette index map for the current block.

In order to encode the palette index map, by scanning palette indices included in the palette index map according to a predetermined scan method, the palette sample mode of each of the plurality of samples in the current block and the run-value of the palette sample mode may be derived (540, 550). For example, in the horizontal traverse scan, palette indices '1, 0, 1, 1, 1' continuously mapped to a third row of the palette index map have the same index value as the palette indices present at the same position of a second row of the palette index map and thus may be encoded in the 'COPY_ABOVE' mode, and the run-value of the palette sample mode may be 4 (540). In addition, in the horizontal traverse scan, palette indices '1, 1, 1' continuously mapped to a second row of the palette index map have an index value different from palette indices present at the same position of a first row of the palette index map and thus may be encoded in the 'INDEX' mode, and the run-value of the 'INDEX' mode may be 2 (550). Meanwhile, an escape palette index (e.g., 2) mapped to a third pixel PX3 which is an escape sample may be encoded in the 'INDEX' mode.

When the palette mode applies to the current block, a predetermined palette index in the palette table may be mapped to each of the plurality of samples in the current block to generate a palette index map, and the palette index included in the palette index map may be encoded in the 'INDEX' mode or the COPY_ABOVE' mode according to a predetermined method.

Hereinafter, syntax elements for the palette mode will be described.

FIG. 6 is a view illustrating some of coding_unit syntax for a palette mode, and FIGS. 7A to 7E are views illustrating palette_coding syntax for a palette mode. The syntax element for the palette mode may be encoded as shown in FIGS. 6 and 7A to 7E and signaled through a bitstream.

First, referring to FIG. 6, a palette mode flag pred_mode_plt_flag may specify whether the palette mode applies to the current block (or the current CU). For example, a first value (e.g., 0) of pred_mode_plt_flag may specify that the palette mode may not apply to the current block. In contrast, a second value (e.g., 1) of pred_mode_plt_flag may specify that the palette mode applies to the current block. When pred_mode_plt_flag is not obtained from the bitstream, the value of pred_mode_plt_flag may be determined to be a first value.

Referring to FIG. 7A, a parameter PredictorPaletteSize[startComp] may specify a size of a palette predictor for a first color component startComp of the palette table (current palette table) for the current block.

In addition, a parameter PalettePredictorEntryReuseFlags[i] may specify whether an i-th palette entry in the palette predictor is in the current palette table (that is, whether it is reused). For example, PalettePredictorEntryReuseFlags[i] having a first value (e.g., 0) may specify that the i-th palette entry in the palette predictor is not reused in the current palette table. In contrast, PalettePredictorEntryReuseFlags[i] having a second value (e.g., 1) may specify that the i-th palette entry in the palette predictor is reused in the current palette table. In an example, an initial value of PalettePredictorEntryReuseFlags[i] may be set to 0.

In addition, a parameter palette_predictor_run may specify the number of 0s present before a non-zero palette entry in a PalettePredictorEntryReuseFlags array.

In addition, a parameter num_signalled_palette_entries may specify the number of palette entries in the current palette table explicitly signaled for a first color component startComp of the current palette table. When num_signalled_palette_entries is not obtained from the bitstream, the value of num_signalled_palette_entries may be inferred as 0.

Referring to FIG. 7B, a parameter CurrentPaletteSize[startComp] may specify a size of the current palette table for the first color component startComp of the current palette table. The value of CurrentPaletteSize[startComp] may be calculated as shown in Equation 1 below. In an example, CurrentPaletteSize[startComp] may have a value of 0 to palette_max_size.

$$CurrentPaletteSize[startComp] = \text{NumPredictedPaletteEntries} + \text{num\_signalled\_palette\_entries} \qquad \text{[Equation 1]}$$

In addition, a parameter new_palette_entries[cIdx][i] may specify a value of a new i-th palette entry signaled for a color component cIdx.

In addition, a parameter PredictorPaletteEntries[cIdx][i] may specify an i-th palette entry in the palette predictor for a color component cIdx.

In addition, a parameter CurrentPaletteEntries[cIdx][i] may specify an i-th palette entry in the current palette table for a color component cIdx.

In addition, a parameter palette_escape_val_present_flag may specify whether an escape sample (escape symbol) is present. For example, palette_escape_val_present_flag having a first value may specify that the current block does not include an escape encoding sample. In contrast, palette_escape_val_present_flag having a second value (e.g., 1) may specify that the current block includes an escape sample. When palette_escape_val_present_flag is not obtained from the bitstream, the value of palette_escape_val_present_flag may be inferred as 1.

In addition, a parameter MaxPaletteIndex may specify a maximum value of the palette index in the current palette table. The value of MaxPaletteIndex may be calculated as shown in Equation 2 below.

$$\text{Max}PaletteIndex = CurrentPaletteSize[startComp] + \\ \text{palette\_escape\_val\_present\_flag} \quad \text{[Equation 2]}$$

In addition, a parameter num_palette_indices_minus1 may specify a value obtained from subtracting 1 from the number of palette indices signaled in the palette encoding process of the current block. When num_palette_indices_minus1 is not obtained from the bitstream, the value of num_palette_indices_minus1 may be inferred as 0.

In addition, a parameter palette_idx_idc may be an indicator a palette index for the current palette table CurrentPaletteEntries. palette_idx_idc may have a value of 0 to MaxPaletteIndex for a first palette index of the corresponding block, and have a value of 0 to MaxPaletteIndex−1 for the remaining palette indices of the corresponding block. When the value of palette_idx_idc is not obtained from the bitstream, the value of palette_idx_idc may be inferred as 0.

In addition, a parameter PaletteIndexIdc[i] may specify an i-th palette_idx_idc. In an example, all values of an array PaletteIndexIdc may be initialized to 0.

In addition, a parameter copy_above_indices_for_final_run_flag may specify a palette index at a last position in the current block is copied from a previous palette index. For example, copy_above_indices_for_final_run_flag having a first value (e.g., 0) may specify that the palette index at the last position in the current block is copied from PaletteIndexIdc[num_palette_indices_minus1]. In contrast, copy_above_indices_for_final_run_flag having a second value (e.g., 1) may specify that the palette index at the last position in the current block is copied from the palette index of a neighboring sample. When the vertical traverse scan is used, the neighboring sample may be present at the same position as the current sample in a left column of the current sample. When the horizontal traverse scan is used, the neighboring sample may be present at the same position as the current sample in an upper row of the current sample. When copy_above_indices_for_final_run_flag is not obtained from the bitstream, the value of copy_above_indices_for_final_run_flag may be inferred as 0.

In addition, a parameter palette_transpose_flag may specify a scan method of a current block (or palette index map). For example, palette_transpose_flag having a first value (e.g., 0) may specify that the horizontal traverse scan applies to the current block. In contrast, palette_transpose_flag having a second value (e.g., 1) may specify that the vertical traverse scan applies to the current block. When palette_transpose_flag is not obtained from the bitstream, the value of palette_transpose_flag may be inferred as 0.

Referring to FIG. 7C, a parameter copy_above_palette_indices_flag may specify an encoding mode (palette sample mode) for the current sample in the current block. For example, copy_above_palette_indices_flag having a first value (e.g., 0) may specify that the palette index mapped to the current sample is encoded in the 'INDEX' mode. In contrast, copy_above_palette_indices_flag having a second value (e.g., 1) may specify that the palette index mapped to the current sample is encoded in the 'COPY_ABOVE' mode.

In addition, a parameter CopyAboveIndicesFlag[xC][yC] may specify an encoding mode for each of the plurality of samples in the current block. That is, CopyAboveIndicesFlag may be an array of copy_above_palette_indices_flag for each of the plurality of samples in the current block. Here, xC and yC may be coordinate indicators specifying relative positions of the current block from the top-left sample of the current picture.

When CopyAboveIndicesFlag[xC][yC] has a first value (e.g., 0), PaletteRunMinus1 may specify a value obtained by subtracting 1 from the number of palette indices continuously encoded using the 'COPY_ABOVE'. In contrast, when CopyAboveIndicesFlag[xC][yC] has a second value (e.g., 1), PaletteRunMinus1 may specify a value obtained by subtracting 1 from the number of palette indices continuously encoded using the 'INDEX' mode.

Referring to FIG. 7D, a parameter PaletteIndexMap[xC][yC] may specify a palette index map for the current block. That is, PaletteIndexMap may be an array of CurrentPaletteEntries for each of the plurality of samples in the current block. Here, xC and yC may coordinate indicators specifying relative positions of the current sample of the top-left sample of the current picture. In an example, PaletteIndexMap[xC][yC] may have a value of 0 to (MaxPaletteIndex−1).

In addition, a parameter PaletteMaxRunMinus1 may specify a maximum value of PaletteRunMinus1. In an example, PaletteMaxRunMinus1 may have a value greater than 0.

In addition, a parameter palette_run_prefix may specify a prefix portion used for binarization of PaletteRunMinus1.

In addition, a parameter palette_run_suffix may specify a suffix portion used for binarization of PaletteRunMinus1. When palette_run_suffix is not obtained from the bitstream, the value of palette_run_suffix may be inferred as 0.

In an example, when the value of PaletteMaxRunMinus1 is 0, the value of PaletteRunMinus1 may be set to 0. In contrast, when PaletteMaxRunMinus1 is greater than 0, PaletteRunMinus1 may be set based on the value of palette_run_prefix. For example, when the value of palette_run_prefix is less than 2, the value of PaletteRunMinus1 may be set as shown in Equation 3 below.

$$PaletteRunMinus1 = \text{palette\_run\_prefix} \quad \text{[Equation 3]}$$

When the value of palette_run_prefix is equal to or greater than 2, the value of PaletteRunMinus1 may be calculated as shown in Equation 4 below.

$$PrefixOffset = 1 << (\text{palette\_run\_prefix} - 1) \quad \text{[Equation 4]}$$
$$PaletteRunMinus1 = PrefixOffset + \text{palette\_run\_suffix}$$

Referring to FIG. 7E, a parameter palette_escape_val may specify a quantized pixel value of an escape sample in the current block.

In addition, a parameter PaletteEscapeVal[cIdx][xC][yC] may specify a quantized pixel value of an escape sample in which the value of PaletteIndexMap[xC][yC] is MaxPaletteIndex and the value of palette_escape_val_present_flag is 1. Here, cIdx may specify a color component, and xC and yC may coordinate indicators specifying relative positions of the current sample from the top-left sample of the current picture.

Hereinafter, a palette encoding/decoding method will be described.

Palette Encoding/Decoding Method

Figure 8:
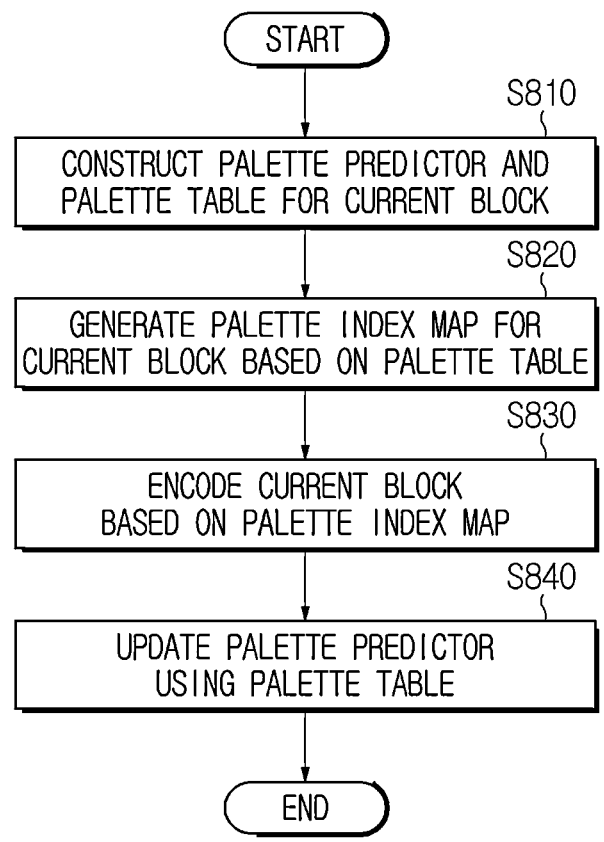
FIG. 8 is a flowchart illustrating a palette encoding method according to an embodiment of the present disclosure.

FIG. 8 is a flowchart illustrating a palette encoding method according to an embodiment of the present disclosure.

The palette encoding method of FIG. 8 may be performed by the image encoding apparatus of FIG. 2. Specifically, steps S810 to S840 may be performed by the intra prediction unit 165 or may be performed by a separate functional block (e.g., a palette encoder) different from the intra prediction unit 165.

Referring to FIG. 8, the image decoding apparatus may construct a palette predictor and a palette table for a current block (S810).

The palette predictor may include at least one palette entry (a representative color value) and a palette index for identifying each palette entry. When the current block is a block palette-encoded for the first time in a current CTU (or slice), the palette predictor may have a predetermined initial value (e.g., 0). In contrast, when the current block is not a block palette-encoded for the first time in a current CTU, the palette predictor may include at least one palette entry used in a previous palette encoding process of the current block.

In an embodiment, the palette predictor may be constructed using at least one user defined palette entry. A user defined palette entry may be set in advance by a contents provider or an encoding company by considering an image characteristic. For example, after pixel values in an image are arranged on a histogram, the user defined palette entry may be set using one or more pixel values with a high appearance frequency. The user defined palette entry may be commonly set for every color component (e.g., Y, Cb, Cr) or individually set for each color component. For example, for a block split into a single tree structure in an image, a user defined palette entry commonly applied to every color component may be set. Alternatively, for a block split into a dual tree structure in an image, a user defined palette entry individually applied to each color component may be set.

An image encoding apparatus may construct a palette table based on a palette predictor. The palette table may include at least one palette entry selected from the palette predictor and a palette index for identifying each palette entry.

In an example, the palette predictor and the palette table may be variously constructed accordingly a color format (or a chroma format) of a current block. For example, when the color format of the current block is a monochrome format, the palette predictor and the palette table may include only a palette entry for a luma component of the current block. On the other hand, in case the color format of the current block is 4:2:0, 4:2:2 or 4:4:4, the palette predictor and the palette table may include palette entries for a luma component and a chroma component of the current block, respectively.

In an example, the palette predictor and the palette table may be variously constructed accordingly a split structure of a current block. For example, when the current block has a single tree structure, the palette predictor and the palette table may have one configuration commonly applicable to the luma component and chroma component of the current block. In contrast, when the current block has a dual tree structure, the palette predictor and the palette table may have a plurality of configurations individually applying to each of the luma component and chroma component of the current block. For example, the palette predictor for the current block may include a luma palette predictor for the luma component and a chroma palette predictor for the chroma component. In this case, the number of palette entries included in the luma palette predictor may be different from the number of palette entries included in the chroma palette predictor.

The image encoding apparatus may generate a palette index map for the current block based on the palette table (S820).

The palette index map may mean a predetermined palette index in the palette table is mapped to each sample in the current block. For example, a palette index specifying a representative color value may be mapped to a sample having a pixel value equal or similar to the representative color value defined in the palette table among a plurality of samples in the current block. In contrast, an escape palette index may be mapped to a sample (escape sample) having a pixel value not similar to the representative color value defined in the palette table among the plurality of samples in the current block. In an example, whether a pixel value of each sample is similar to the representative color value defined in the palette table may be determined based on a predetermined threshold. For example, when a difference between a pixel value of each sample and a representative color value is equal to or less than a predetermined threshold, a palette index specifying the representative color value may be mapped to the corresponding sample. In contrast, when the difference between the pixel value of each sample and the representative color value exceeds the predetermined threshold, an escape palette index may be mapped to the corresponding sample.

The image encoding apparatus may encode the current block based on the palette index map (S830).

The encoding process of the current block may be performed by scanning the palette indices in the palette index map according to a predetermined scan method. Specifically, the image encoding apparatus may determine an encoding mode (palette sample mode) of each of the palette indices by scanning the palette indices mapped to the current block according to the predetermined scan method.

The scan method for palette encoding may include horizontal traverse scan and vertical traverse scan as described above with reference to FIG. 15. In an example, information on the scan method may be signaled using palette_transpose_flag. For example, when horizontal traverse scan is used for palette encoding of the current block, palette_transpose_flag having a first value (e.g., 0) may be signaled. In contrast, when vertical traverse scan is used for palette encoding of the current block, palette_transpose_flag having a second value (e.g., 1) may be signaled.

An encoding mode for encoding each of the palette indices mapped to the current block may be referred to as a palette sample mode. The palette sample mode may include an 'INDEX' mode and a 'COPY_ABOVE' mode. When the palette sample mode is determined to be the 'INDEX' mode, the value of the corresponding palette index may be encoded. In contrast, when the palette sample mode is determined to be the 'COPY_ABOVE' mode, the value of the corresponding palette index may not be encoded, and information may be encoded specifying that the corresponding palette index has the same value as a palette index present above (in case of horizontal traverse scan) or to the left (in case of vertical traverse scan). In an example, information on the palette sample mode may be signaled using copy_above_palette_indices_flag. For example, when the palette sample mode for a current sample is determined to be the 'INDEX' mode, copy_above_palette_indices_flag having a first value (e.g., 0) may be signaled. In contrast, when the palette sample mode for the current sample is determined to be the 'COPY_ABOVE' mode, copy_above_palette_indices_flag having a second value (e.g., 1) may be signaled.

In addition, in the 'INDEX' mode and the 'COPY_ABOVE' mode, run-value information specifying the number of palette indices continuously encoded using the same palette sample mode may be additionally encoded.

Meanwhile, in case of an escape sample, a quantized pixel value of the escape sample may be encoded. In an example, whether the current block includes the escape sample may be signaled using an escape sample flag (e.g., palette_escape_val_present_flag). For example, when the current block does not include the escape sample, palette_escape_val_present_flag having a first value (e.g., 0) may be signaled. In contrast, when the current block includes the escape sample, palette_escape_val_present_flag having a second value (e.g., 1) may be signaled.

The image encoding apparatus may update the palette predictor using the palette table for the current block (S840). For example, the image encoding apparatus may update the palette predictor by adding at least one palette entry, which is included in the palette table, to the palette predictor. In addition, the image encoding apparatus may update the palette predictor by replacing at least one palette entry, which is included in the palette predictor, with at least one palette entry included in the palette table. In this case, the palette entry replaced in the palette predictor may be determined to be the oldest palette entry or least frequently used palette entry according to a first-in first-out (FIFO) method.

In an example, the update process of the palette predictor may be continuously performed until the palette predictor reaches a maximum size. When the palette predictor does not reach the maximum size, at least one palette entry in the palette predictor which is not reused in the palette table may be added as a new palette predictor. This may be referred to as palette stuffing. In addition, information on the updated palette predictor may be encoded and signaled.

Figure 9:
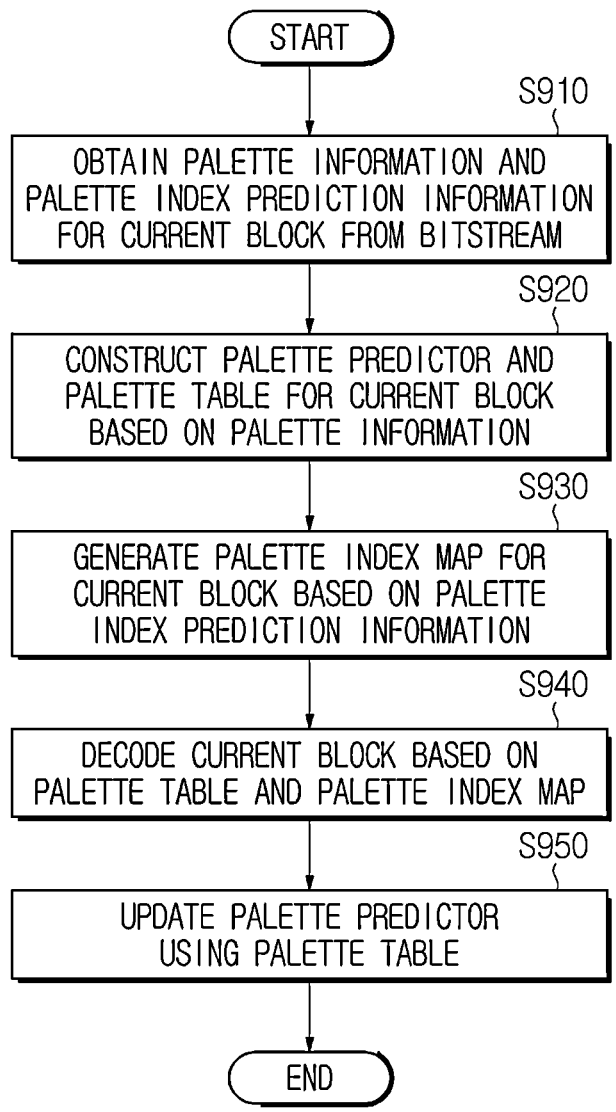
FIG. 9 is a flowchart illustrating a palette decoding method according to an embodiment of the present disclosure.

FIG. 9 is a flowchart illustrating a palette decoding method according to an embodiment of the present disclosure.

The palette decoding method of FIG. 9 may be performed by the image decoding apparatus of FIG. 3. Specifically, steps S910 to S960 may be performed by the intra prediction unit 265 or a separate functional block (e.g., palette decoder) different from the intra prediction unit 265.

Referring to FIG. 9, the image decoding apparatus may obtain palette information and palette index prediction information of the current block from a bitstream (S910).

The palette information may include information on a palette predictor. In addition, the palette information may further include information on a new palette entry. In an example, the image decoding apparatus may obtain the information on the palette predictor by decoding PredictorPaletteEntries[cIdx][i] included in the bitstream. In addition, in an example, the image decoding apparatus may obtain the information on the new palette entry by decoding new_palette_entries[cIdx][i] included in the bitstream. In PredictorPaletteEntries[cIdx][i] and new_palette_entries[cIdx][i], cIdx may mean a color component.

The palette index prediction information may include information on a palette index map for the current block. In an example, the image decoding apparatus may obtain at least one palette index mapped to the current block by decoding PaletteIndexMap[xC][yC] included in the bitstream. Here, xC and yC may be coordinate indicators specifying relative positions of the current sample from the top-left sample of a CTU (or slice) to which the current block belongs. In an example, the image decoding apparatus may obtain run-value information of the palette index included in the palette index map by decoding PaletteRunMinus1 included in the bitstream.

The image decoding apparatus may construct a palette predictor and palette table for the current block based on the palette information obtained from the bitstream (S920).

In an example, the image decoding apparatus may construct the palette predictor for the current block based PredictorPaletteEntries[cIdx][i] included in the bitstream. The palette predictor may have, for example, a predetermined value (e.g., 0) initialized at a first decoding time of the CTU (or slice) including the current block. Alternatively, the palette predictor may have the same configuration as the palette predictor updated in a previous palette decoding process.

In an embodiment, the palette predictor may be constructed using at least one user defined palette entry. A user defined palette entry may be set in advance by a contents provider or an encoding company by considering an image characteristic. For example, after pixel values in an image are arranged on a histogram, the user defined palette entry may be set using predetermined pixel values with a high appearance frequency. The user defined palette entry may be commonly set for every color component (e.g., Y, Cb, Cr) or individually set for each color component. For example, for a block split into a single tree structure in an image, a user defined palette entry commonly applied to every color component may be set. Alternatively, for a block split into a dual tree structure in an image, a user defined palette entry individually applied to each color component may be set.

The image decoding apparatus may construct a palette table for the current block based on the palette predictor. The palette table may include at least one of the palette entry included in the palette predictor or the new palette entry obtained from the bitstream and a palette index for identifying each palette entry.

In an example, the palette predictor and the palette table may be variously constructed accordingly a color format (or a chroma format) of a current block. For example, the palette predictor and the palette table may include only a palette entry for a luma component or a palette entry for each of a luma component and a chroma component, according to the color format of the current block.

In an example, the palette predictor and the palette table may be variously constructed accordingly a split structure of a current block. For example, when the current block has a single tree structure, the palette predictor and the palette table may have a single configuration commonly applying to the luma component and chroma component of the current block. In contrast, when the current block has a dual tree structure, the palette predictor and the palette table may have multiple configurations separately applying to the luma component and chroma component of the current block.

The image decoding apparatus may generate a palette index map for the current block based on the palette index prediction information obtained from the bitstream (S930). Specifically, the image decoding apparatus may generate the palette index map by mapping the palette index to each sample in the current block according to a predetermined scan method by means of the palette index obtained from the bitstream, the palette sample mode and the run-value of the palette sample mode.

The scan method for palette decoding may include horizontal traverse scan and vertical traverse scan as described above with reference to FIG. 15. In an example, the scan method for palette decoding may be determined by decoding palette_transpose_flag included in the bitstream. For example, when palette_transpose_flag has a first value (e.g., 0), the scan method for palette decoding may be determined to be horizontal traverse scan. In contrast, when palette_transpose_flag has a second value (e.g., 1), the scan method for palette decoding may be determined to be vertical traverse scan.

The palette sample mode may include an 'INDEX' mode and a 'COPY_ABOVE' mode, as described above. When the 'INDEX' mode applies to the current sample, the value of the palette index mapped to the current sample may be directly obtained from the bitstream. In contrast, when the 'COPY_ABOVE' mode applies to the current sample, the value of the palette index mapped to the current sample may be determined to be the value of the palette index mapped to a neighboring sample present above (in case of horizontal traverse scan) or to the left (in case of vertical traverse scan) of the current sample.

Meanwhile, when the current sample is an escape sample, a quantized pixel value of the current sample may be directly obtained from the bitstream. An escape palette index may be mapped to the escape sample.

The image decoding apparatus may decode the current block based on the palette table and the palette index map for the current block (S940). Specifically, the image decoding apparatus may generate a prediction block for the current block by inversely mapping the value of each palette index in the palette index map to a representative color value with reference to the palette table.

The image decoding apparatus may update the palette predictor using the palette table for the current block (S950). For example, the image decoding apparatus may update the palette predictor by adding at least one palette entry, which is included in the palette table, to the palette predictor. In addition, the image decoding apparatus may also update the palette predictor by replacing at least one palette entry, which is included in the palette predictor, with at least one palette entry included in the palette table. In this case, the palette entry replaced in the palette predictor may be determined to be the oldest palette entry or least frequently used palette entry according to a first-in first-out (FIFO) method.

In an example, the update process of the palette predictor may be continuously performed until the palette predictor reaches a maximum size. When the palette predictor does not reach the maximum size, at least one palette entry in the palette predictor which is not reused in the palette table may be added as a new palette predictor. This may be referred to as palette stuffing.

In an example, the image decoding apparatus may update the palette predictor based on update information of the palette predictor signaled from the image encoding apparatus.

Hereinafter, embodiments of the present disclosure will be described in detail with reference to the accompanying drawings.

Embodiment #1

In an embodiment, a user defined palette entry may be signaled through an APS.

FIG. 10 is a view illustrating an example of an APS for signaling a user defined palette entry. FIG. 11 is a view illustrating an example of a palette entry function.

First, referring to FIG. 10, the parameter aps_params_type may specify a parameter type of APS (adaptation_parameter_set_rbsp). Table 1 shows an example of the parameter type of APS.

TABLE 1

| aps_params_type | Name of aps_parmas_type | Type of APS parameters |
|---|---|---|
| 0 | ALF_APS | ALF parameters |
| 1 | LMCS_APS | LMCS parameters |
| 2 | SCALING_APS | Scaling list parameters |
| 3 | PLT_APS | Palette entry parameters |
| 4 . . . 7 | Reserved | Reserved |

Referring to Table 1, when the parameter type number of APS (aps_params_type) is 0, APS may include parameters associated with an adaptive loop filter (ALF) and may be referred to as ALF_APS. In addition, when the parameter type number of APS (aps_params_type) is 1, APS may include parameters associated with luma mapping with chroma scaling (LMCS) and may be referred to as LMCS_APS. In addition, when the parameter type number of APS (aps_params_type) is 2, APS may include parameters associated with a scaling list and may be referred to as SCALING_APS. In addition, when the parameter type number of APS (aps_params_type) is 3, APS may include parameters associated with a palette entry and may be referred to as PLT_APS. Meanwhile, the remaining parameter type numbers (apa_params_type=4 to 7) may be numbers reserved for indicating a new parameter type of APS.

Referring to FIG. 10 again, when the parameter type of APS is a palette type apa_params_type==PLT_APS, the palette entry function plt_entries_data may be called to signal a user defined palette entry. An example of the palette entry function may be illustrated in FIG. 11.

Referring to FIG. 11, a parameter num_predictor_plt_entries_minus1 may specify a value obtained by subtracting 1 from the number of user defined palette entries included in an APS. The number of user defined palette entries may be equal to or smaller than a maximum size of a palette predictor PaletteMaxPredictorSize.

A parameter plt_predictor_plt_entries[compId][i] may specify a user defined palette entry used for initializing a palette predictor. Here, compId represents identification information of each color component (e.g., Y, Cb, Cr), and i may increase from 0 to num_predictor_plt_entries_minus1 by 1. In this case, plt_predictor_plt_entries[0][i] may have a value equal to or greater than 0 and equal to or smaller than $(1<<BitDepth_Y)-1$. Herein, BitDepth may mean a bit depth of a luma sample. In addition, plt_predictor_plt_entries[1][i] and plt_predictor_plt_entries[2][i] may each have a value equal to or greater than 0 and equal to or smaller than $(1<<BitDepth_C)-1$. Herein, BitDepth may mean a bit depth of a chroma sample.

The palette predictor may be initialized based on a high level syntax such as a slice header syntax.

FIG. 12 is a view illustrating an example of a slice header syntax for initializing a palette predictor. FIG. 13 is a view illustrating an example of a process of initializing a palette predictor.

First, referring to FIG. 12, based on a value of a first palette enabling flag sps_palette_enabled_flag, a second palette enabling flag slice_palette_enabled_flag may be signaled.

The first palette enabling flag may specify whether or not a palette mode is available at a sequence level. For example, the first palette enabling flag having a first value (e.g., 0) may specify that the palette mode is not applicable to a current sequence. In contrast, the first palette enabling flag having a second value (e.g., 1) may specify that the palette mode is applicable to a current sequence. When a palette mode is applicable to a current sequence (spa_palette_enabled_flag=1), the palette mode may apply to every slice (or CTU) in the current sequence.

The second palette enabling flag may specify whether or not a palette mode is available at a slice level. For example, the second palette enabling flag having a first value (e.g., 0) may specify that the palette mode is not applicable to a current slice. In contrast, the second palette enabling flag having a second value (e.g., 1) may specify that the palette mode is applicable to the current slice. When a palette mode is applicable to a current slice (slice_palette_enabled_flag=1), the palette mode may apply to every block (or CU) in the current slice.

The second palette enabling flag may be signaled only when a palette model is available at a sequence level. For example, the second palette enabling flag may be signaled only when the first palette enabling flag has a second value (sps_palette_enabled_flag=1).

Based on a value of the second palette enabling flag, identification information of a palette type APS applying to a current slice (slice_palette_aps_id) may be signaled. For example, when the second palette enabling flag has a first value (slice_palette_enabled_flag=0), slice_palette_aps_id may not be signaled. In this case, a palette predictor for the current slice may be initialized to a predetermined value (e.g., 0). In contrast, when the second palette enabling flag has a second value (slice_palette_enabled_flag=1), slice_palette_aps_id may be signaled. In this case, based on a palette type APS identified by slice_palette_aps_id, the palette predictor for the current slice may be initialized using a user defined palette entry. In an example, slice_palette_aps_id may have a same value for all the slices in a current picture.

Meanwhile, a TemporalID value of an APS NAL unit having a palette type as a parameter type and same identification information as slice_palette_aps_id may be equal to or smaller than a TemporalID value of an encoded slice NAL unit.

An example process of initializing a palette predictor using the slice header syntax of FIG. 12 is illustrated in FIG. 13.

Referring to FIG. 13, when a current CTU is a first CTU in a brick, a palette predictor may be initialized using a user defined palette entry. Alternatively, when an entropy coding synchronization process is enabled (entropy_coding_sync_enabled_flag=1) and a current CTU is a first CTU of each CTU row (either CtbAddrInRs?% PicWidthInCtbsY is equal to 0 or BrickId[CtbAddrInBs] is not equal to BrickId[CtbAddrRsToBs[CtbAddrInRs−1]], a palette predictor may be initialized using a user defined palette entry. Otherwise, a size of the palette predictor PredictorPaletteSize may be initialized to 0.

A process of initializing a palette predictor by using a user defined palette predictor may be performed based on the slice header syntax of FIG. 12. For example, a user defined palette entry plt_predictor_plt_entry[cIdx][i] of each color component (cIdx=0 to cIdx=2) may be derived from an APS identified by slice_palette_aps_id described above with reference to FIG. 12. In addition, a palette predictor size of each color component PredictorPaletteSize[cIdx] may be set to a same value as a number of user defined palette entries num_predictor_plt_entries_minus1+1.

For every color component (cIdx=0 to cIdx=2), a palette entry in a palette predictor PredictorPaletteEntries[cIdx][i] may be set to a user defined palette entry plt_predictor_plt_entry[cIdx][i]. Here, i may be equal to or greater than 0 and be smaller than a value of PredictorPaletteSize[cIdx].

Through the above-described process, a palette predictor size of each color component PredictorPaletteSize[cIdx] and a palette entry PredictorPaletteEntries[cIdx][i] for a current slice may be initialized. In this case, the palette predictor size of each color component PredictorPaletteSize[cIdx] may be equal to or smaller than a maximum size of a palette predictor PaletteMaxPredictorSize.

According to Embodiment #1, a user defined palette entry may be signaled through an APS. Accordingly, compared with signaling a user defined palette entry through a high level syntax (e.g., SPS), signaling overhead may be reduced, and a palette predictor may be adaptively initialized.

Embodiment #2

A slice header syntax for initializing a palette predictor and an initializing process using the syntax are illustrated in FIG. 14 and FIG. 15.

FIG. 14 is a view illustrating another example of a slice header syntax for initializing a palette predictor. FIG. 15 is a view illustrating another example of a process of initializing a palette predictor.

First, referring to FIG. 14, based on a value of a first palette enabling flag sps_palette_enabled_flag, a second palette enabling flag slice_palette_enabled_flag may be signaled.

The first palette enabling flag may specify whether or not a palette mode is available at a sequence level. For example, the first palette enabling flag having a first value (e.g., 0) may specify that the palette mode is not applicable to a current sequence. In contrast, the first palette enabling flag having a second value (e.g., 1) may specify that the palette mode is applicable to a current sequence. When a palette mode is applicable to a current sequence (spa_palette_enabled_flag=1), the palette mode may apply to every slice (or CTU) in the current sequence.

The second palette enabling flag may specify whether or not a palette mode is available at a slice level. For example, the second palette enabling flag having a first value (e.g., 0) may specify that the palette mode is not applicable to a current slice. In contrast, the second palette enabling flag having a second value (e.g., 1) may specify that the palette mode is applicable to the current slice. When a palette mode is applicable to a current slice (slice_palette_enabled_flag=1), the palette mode may apply to every block (or CU) in the current slice.

The second palette enabling flag may be signaled only when a palette model is available at a sequence level. For example, the second palette enabling flag may be signaled only when the first palette enabling flag has a second value (sps_palette_enabled_flag=1).

Based on a value of the second palette enabling flag, first APS identification information for a luma sample of a current slice slice_palette_aps_id_luma may be signaled. For example, when the second palette enabling flag has a first value (slice_palette_enabled_flag=0), slice_palette_aps_id_luma may not be signaled. In this case, a palette predictor for a luma sample and a chroma sample of the current slice may be initialized to a predetermined value (e.g., 0). In contrast, when the second palette enabling flag has a second value (slice_palette_enabled_flag=1), slice_palette_aps_id_luma may be signaled. In this case, based on a palette type APS identified by slice_palette_aps_id_luma, the palette predictor for the luma sample of the current slice may be initialized using a user defined palette entry. In an example, slice_palette_aps_id_luma may have a same value for all the slices in a current picture.

Meanwhile, a TemporaID value of an APS NAL unit having a palette type as a parameter type and same identification information as slice_palette_aps_id_luma may be equal to or smaller than a TemporalID value of an encoded slice NAL unit.

Furthermore, based on a value of qtbtt_dual_tree_intra_flag, second APS identification information for a chroma sample of the current slice slice_palette_aps_id_chroma may be signaled. Herein, qtbtt_dual_tree_intra_flag may specify whether or not a split structure of a current CU is a dual tree structure. Specifically, qtbtt_dual_tree_intra_flag having a first value (e.g., 0) may specify that a luma sample and a chroma sample in an I slice are split in a single tree structure. In contrast, qtbtt_dual_tree_intra_flag having a second value (e.g., 1) may specify that each CTU in an I slice is implicit-quadtree-split into 64×64 luma sample CUs and the 64×64 luma sample CU is a root node of a dual tree structure.

When qtbtt_dual_tree_intra_flag has a second value (e.g., 1) (that is, when the split structure of a current block is a dual tree structure), slice_palette_aps_id_chroma may be signaled. In this case, based on a palette type APS identified by slice_palette_aps_id_chroma, the palette predictor for the chroma sample of the current slice may be initialized using a user defined palette entry. That is, a palette predictor for the current slice may be initialized using different palette type APSs for the luma sample and the chroma sample. In an example, slice_palette_aps_id_chroma may have a same value for all the slices in a current picture.

When qtbtt_dual_tree_intra_flag has a first value (e.g., 0) (that is, when the split structure of a current block is a single tree structure), slice_palette_aps_id_chroma may not be signaled. In this case, it may be inferred that slice_palette_aps_id_chroma has a same value as slice_palette_aps_id_luma. In addition, based on a palette type APS identified by slice_palette_aps_id_luma, the palette predictor for the chroma sample of the current slice may be initialized using a user defined palette entry. That is, a palette predictor for the current slice may be initialized using a same palette type APS for the luma sample and the chroma sample.

Meanwhile, a TemporaID value of an APS NAL unit having a palette type as a parameter type and same identification information as slice_palette_aps_id_chroma may be equal to or smaller than a TemporalID value of an encoded slice NAL unit.

An example process of initializing a palette predictor using the slice header syntax of FIG. 14 is illustrated in FIG. 15.

Referring to FIG. 15, when a current CTU is a first CTU in a brick, a palette predictor may be initialized using a user defined palette entry. Alternatively, when an entropy coding synchronization process is enabled (entropy_coding_sync_enabled_flag=1) and a current CTU is a first CTU of each CTU row (either CtbAddrInRs?% PicWidthInCtbsY is equal to 0 or BrickId[CtbAddrInBs] is not equal to BrickId[CtbAddrRsToBs[CtbAddrInRs−1]], a palette predictor may be initialized using a user defined palette entry. Otherwise, a size of the palette predictor PredictorPaletteSize may be initialized to 0.

A process of initializing a palette predictor by using a user defined palette predictor may be performed based on the slice header syntax of FIG. 14. For example, a user defined palette entry plt_predictor_plt_entry[0][i] for a luma sample may be derived from an APS identified by slice_palette_aps_id_luma described above with reference to FIG. 14. In addition, user defined palette entries plt_predictor_plt_entry[1][i] and plt_predictor_plt_entry[2][i] for a chroma sample may be derived from an APS identified by slice_palette_aps_id_chroma.

A palette predictor size for a luma sample numPredictorPltEntriesLuma may be set to a same value as a number of user defined palette entries num_predictor_plt_entries_minus1+1. In addition, a palette predictor size for a chroma sample numPredictorPltEntriesChroma may be set to a same value as a number of user defined palette entries num_predictor_plt_entries_minus+1.

Palette entries in a palette predictor PredictorPaletteEntries[cIdx][i] may be set to a user defined palette entry plt_predictor_plt_entry[cIdx][i]. Here, i may be equal to or greater than 0 and be smaller than a value of numPredictorPltEntriesLuma.

For a chroma sample (cIdx=1 and cIdx=2), a palette entry in a palette predictor PredictorPaletteEntries[cIdx][i] may be set to a user defined palette entry plt_predictor_plt_entry[cIdx][i]. Here, i may be equal to or greater than 0 and be smaller than a value of numPredictorPltEntriesChroma.

Through the above-described process, a palette predictor size of each color component PredictorPaletteSize[cIdx] and a palette entry PredictorPaletteEntries[cIdx][i] for a current slice may be initialized. In this case, the palette predictor size of each color component PredictorPaletteSize[cIdx] may be equal to or smaller than a maximum size of a palette predictor PaletteMaxPredictorSize.

According to Embodiment #2, encoding/decoding efficiency may be improved by signaling identification information of palette type APSs for a luma sample and a chroma sample respectively based on a block split structure.

Embodiment #3

In an embodiment, information on a palette table and a maximum size of a palette predictor may be signaled through a high level syntax, for example, through an SPS.

FIG. 16 is a view illustrating an example of a syntax for setting the maximum size of a palette table and of a palette predictor.

Referring to FIG. 16, a palette enabling flag sps_palette_enabled_flag of a sequence level may be signaled based on a color format of a current slice. For example, only when the color format of the current slice is a 4:4:4 format (chroma_format_idc=3), spa_palette_enabled_flag may be signaled. Herein, the color format may specify a constitutional format of a luma sample and a chroma sample and may be referred to as a chroma format. Identification information of the color format chroma_format_idc may be signaled through a high level syntax, for example, through an SPS. In an example, when chroma_format_idc is 0, a color format of a current slice may be monochrome. In addition, when chroma_format_idc is 1, the color format of the current slice may be a 4:2:0 format. In addition, when chroma_format_idc is 2, the color format of the current slice may be a 4:2:2 format. In addition, when chroma_format_idc is 3, the color format of the current slice may be a 4:4:4 format.

Meanwhile, unlike what is illustrated in FIG. 16, sps_palette_enabled_flag may be signaled only when the color format of a current slice is a 4:2:0 format (chroma_format_idc=1) or a 4:2:2 format (chroma_format_idc=2). Alternatively, spa_palette_enabled_flag may be signaled irrespective of the color format of a current slice (that is, chroma_format_idc=0 to 3).

When sps_palette_enabled_flag has a second value (e.g., 1) (that is, a palette mode is applicable to a current slice), the parameter sps_max_palette_size and the parameter sps_max_palette_predictor_delta_size may be signaled.

sps_max_palette_size may specify a maximum size of a palette table. When sps_max_palette_size is not signaled, a value of sps_max_palette_size may be inferred to be 0.

sps_max_palette_predictor_delta_size may specify a difference between a maximum size of a palette predictor and a maximum size of a palette table. When sps_max_palette_predictor_delta_size is not signaled, a value of sps_max_palette_predictor_delta_size may be inferred to be 0.

The maximum size of a palette predictor PaletteMaxPredictorSize may be calculated using sps_max_palette_size and sps_max_palette_predictor_delta_size, as shown in Equation 5.

$$PaletteMaxPredictorSize = \text{sps\_max\_palette\_size} + \text{sps\_max\_palette\_predictor\_delta\_size} \quad \text{[Equation 5]}$$

According to Embodiment #3, as information on the maximum sizes of a palette table and a palette predictor respectively is signaled through a high level syntax (e.g., SPS), encoding/decoding efficiency may be improved.

Embodiment #4

In an embodiment, an input bit depth of a user defined palette entry may be signaled through a high level syntax, for example, through an SPS seq_parameter_set_rbsp.

FIG. 17 is a view illustrating an example of SPS for signaling an input bit depth of a user defined palette entry.

First, referring to FIG. 17, the parameter input_bit_depth_luma_minus8 may indicate a value obtained by subtracting 8 from an input bit depth for a luma sample. That is, the input bit depth InputBitDepth for a luma sample may be calculated using a value of input_bit_depth_luma_minus8, as shown in Equation 6.

$$InputBitDepthY = 8 + \text{input\_bit\_depth\_luma\_minus8} \quad \text{[Equation 6]}$$

In addition, a quantization parameter offset QpInputBdOffsetY for a luma sample may be calculated using a value of input_bit_depth_luma_minus8, as shown in Equation 7.

$$QpInputBdOffsetY = 6 * \text{input\_bit\_depth\_luma\_minus8} \quad \text{[Equation 7]}$$

The parameter input_bit_depth_chroma_minus8 may indicate a value obtained by subtracting 8 from an input bit depth for a chroma sample. That is, the input bit depth InputBitDepth for a chroma sample may be calculated using a value of input_bit_depth_chroma_minus8, as shown in Equation 8.

$$InputBitDepthC = 8 + \text{input\_bit\_depth\_chroma\_minus8} \quad \text{[Equation 8]}$$

In addition, a quantization parameter offset QpInputBdOffsetc for a chroma sample may be calculated using a value of input_bit_depth_chroma_minus8, as shown in Equation 9.

$$QpInputBdPffsetC = 6 * \text{input\_bit\_depth\_chroma\_minus8} \quad \text{[Equation 9]}$$

Here, the values of input_bit_depth_luma_minus8 and input_bit_depth_luma_minus8 respectively may be equal to or greater than 0 and equal to or smaller than 8.

A user defined palette entry may be signaled within a range of the above-described input bit depths InputBitDepthY and InputBitDepthc by using syntaxes described above with reference to FIG. 10 to FIG. 16.

According to Embodiment #4, as a bit depth of a user defined palette entry is signaled through a high level syntax (e.g., SPS), encoding/decoding efficiency may be improved.

Embodiment #5

In an embodiment, a bit depth of a user defined palette entry may be signaled through a palette entry function which is called through an APS.

FIG. 18 is a view illustrating another example of a palette entry function.

Unlike the palette entry function of FIG. 11, the palette entry function plt_entries_data of FIG. 18 may further include a bit depth of a user defined palette entry.

Referring to FIG. 18, the parameter plt_entry_bit_depth_minus8 may indicate a value obtained by subtracting 8 from a bit depth of a user defined palette entry. That is, a bit depth of a user defined palette entry pltBitDepth may be calculated using plt_entry_bit_depth_minus8, as shown in Equation 10.

$$pltBitDepth = 8 + \text{plt\_entry\_bit\_depth\_minus8} \quad \text{[Equation 10]}$$

A parameter num_predictor_plt_entries_minus1 may specify a value obtained by subtracting 1 from the number of user defined palette entries included in an APS. The number of user defined palette entries may be equal to or smaller than a maximum size of a palette predictor PaletteMaxPredictorSize.

A parameter plt_predictor_plt_entries[compId][i] may specify a user defined palette entry used for initializing a palette predictor. Here, compId represents identification information of each color component (e.g., Y, Cb, Cr), and i may increase from 0 to num_predictor_plt_entries_minus1 by 1. In this case, plt_predictor_plt_entries[0][i] may have a value equal to or greater than 0 and equal to or smaller than (1<<pltBitDepth)−1. In addition, plt_predictor_plt_entries[1][i] and plt_predictor_plt_entries[2][i] may each have a value equal to or greater than 0 and equal to or smaller than (1<<pltBitDepth)−1.

A user defined palette entry may be signaled within a range of the above-described bit depth pltBitDepth by using syntaxes described above with reference to FIG. 10 to FIG. 16.

According to Embodiment #5, as a bit depth of a user defined palette entry is signaled through a palette entry function plt_entries_data, encoding/decoding efficiency may be improved.

Embodiment #6

In an embodiment, a palette predictor for a current slice may be initialized based on a high level syntax such as a slice header syntax.

FIG. 19 is a view illustrating yet another example of a slice header syntax for initializing a palette predictor. Unlike the slice header syntaxes of FIG. 12 and FIG. 14, the slice header syntax of FIG. 19 may signal identification information of a palette type APS based on whether or not there is a palette type APS applicable to a current slice.

Referring to FIG. 19, based on a value of the palette enabling flag sps_palette_enabled_flag, the palette APS flag slice_palette_aps_id_present_flag may be signaled.

The palette enabling flag may specify whether or not a palette mode is available at a sequence level. For example, the palette enabling flag having a first value (e.g., 0) may specify that the palette mode is not applicable to a current sequence. In contrast, the palette enabling flag having a second value (e.g., 1) may specify that the palette mode is applicable to a current sequence. When a palette mode is applicable to a current sequence, the palette mode may apply to every slice (or coding unit tree (CTU)) in the current sequence.

A palette APS flag may specify whether or not there is a palette type APS applicable to a current slice. For example, a palette APS flag having a first value (e.g., 0) may specify that there is no palette type APS for a current slice. In contrast, a palette APS flag having a second value (e.g., 1) may specify that there is a palette type APS for a current slice.

A palette APS flag may be signaled only when a palette mode is applicable to a current sequence. For example, the palette APS flag may be signaled only when a palette enabling flag has a second value (sps_palette_enabled_flag=1).

Based on a value of a palette APS flag, identification information of a palette type APS applying to a current slice (slice_palette_aps_id) may be signaled. For example, when the palette APS flag has a first value (slice_palette_aps_id_present_flag=0), slice_palette_aps_id may not be signaled. In this case, a palette predictor for the current slice may be initialized to a predetermined value (e.g., 0). In contrast, when the palette APS flag has a second value (slice_palette_aps_id_present_flag=1), slice_palette_aps_id may be signaled. In this case, based on a palette type APS identified by slice_palette_aps_id, the palette predictor for the current slice may be initialized using a user defined palette entry. In an example, slice_palette_aps_id may have a same value for all the slices in a current picture.

Meanwhile, a TemporalID value of an APS NAL unit having a palette type as a parameter type and same identification information as slice_palette_aps_id may be equal to or smaller than a TemporalID value of an encoded slice NAL unit.

An example process of initializing a palette predictor based on the slice header syntax of FIG. 19 is the same as described above with reference to FIG. 13.

According to Embodiment #6, encoding/decoding efficiency may be improved by signaling identification information of a palette type APS based on whether or not there is an available palette type APS.

Embodiment #7

Another example of a slice header syntax for initializing a palette predictor is illustrated in FIG. 20.

FIG. 20 is a view illustrating yet another example of a slice header syntax for initializing a palette predictor.

Unlike the slice header syntax of FIG. 19, the slice header syntax of FIG. 20 may separately signal identification information of palette type APSs for a luma sample and a chroma sample respectively.

Referring to FIG. 20, based on a value of the palette enabling flag sps_palette_enabled_flag, the palette APS flag slice_palette_aps_id_present_flag may be signaled.

The palette enabling flag may specify whether or not a palette mode is available at a sequence level. For example, the palette enabling flag having a first value (e.g., 0) may specify that the palette mode is not applicable to a current sequence. In contrast, the palette enabling flag having a second value (e.g., 1) may specify that the palette mode is applicable to a current sequence. When a palette mode is applicable to a current sequence, the palette mode may apply to every slice (or coding unit tree (CTU)) in the current sequence.

A palette APS flag may specify whether or not there is a palette type APS applicable to a luma sample of a current slice. For example, a palette APS flag having a first value (e.g., 0) may specify that there is no palette type APS for a luma sample of a current slice. In contrast, a palette APS flag having a second value (e.g., 1) may specify that there is a palette type APS for a luma sample of a current slice.

A palette APS flag may be signaled only when a palette mode is applicable to a current sequence. For example, the palette APS flag may be signaled only when a palette enabling flag has a second value (sps_palette_enabled_flag=1).

Based on a value of a palette APS flag, identification information of a palette type APS applying to a current slice (slice_palette_aps_id) may be signaled. For example, when the palette APS flag has a first value (slice_palette_aps_id_present_flag=0), slice_palette_aps_id may not be signaled. In this case, a palette predictor for the current slice may be initialized to a predetermined value (e.g., 0). In contrast, when the palette APS flag has a second value (slice_palette_aps_id_present_flag=1), slice_palette_aps_id may be signaled. In this case, based on a palette type APS identified by slice_palette_aps_id, the palette predictor for the luma sample of the current slice may be initialized using a user defined palette entry. In an example, slice_palette_aps_id may have a same value for all the slices in a current picture.

Meanwhile, a TemporalID value of an APS NAL unit having a palette type as a parameter type and same identification information as slice_palette_aps_id may be equal to or smaller than a TemporalID value of an encoded slice NAL unit.

Furthermore, based on a value of qtbtt_dual_tree_intra_flag, APS identification information for a chroma sample of the current slice slice_palette_aps_id_chroma may be signaled. Herein, qtbtt_dual_tree_intra_flag may specify whether or not each CTU has a dual tree structure. For example, qtbtt_dual_tree_intra_flag having a first value (e.g., 0) may specify that each CTU in an I slice has a single tree structure. In contrast, qtbtt_dual_tree_intra_flag having a second value (e.g., 1) may specify that each CTU in an I slice has a dual tree structure.

When qtbtt_dual_tree_intra_flag has a second value (qtbtt_dual_tree_intra_flag=1), slice_palette_aps_id_chroma may be signaled. In this case, based on a palette type APS identified by slice_palette_aps_id_chroma, the palette predictor for the chroma sample of the current slice may be initialized using a user defined palette entry. That is, a palette predictor for the current slice may be initialized using different palette type APSs for the luma sample and the chroma sample. In an example, slice_palette_aps_id_chroma may have a same value for all the slices in a current picture.

In contrast, when slice_palette_aps_id_chroma is not signaled, it may be inferred that slice_palette_aps_id_chroma has a same value as slice_palette_aps_id_luma. In this case, based on a palette type APS identified by slice_palette_aps_id_luma, the palette predictor for the chroma sample of the current slice may be initialized using a user defined palette entry. That is, a palette predictor for the current slice may be initialized using a same palette type APS for the luma sample and the chroma sample.

Meanwhile, a TemporaID value of an APS NAL unit having a palette type as a parameter type and same identification information as slice_palette_aps_id_chroma may be equal to or smaller than a TemporalID value of an encoded slice NAL unit.

An example process of initializing a palette predictor based on the slice header syntax of FIG. 20 is the same as described above with reference to FIG. 15.

According to Embodiment #7, encoding/decoding efficiency may be improved by signaling identification information of a palette type APS for a luma sample and a chroma sample respectively based on whether or not there is an available palette type APS.

Embodiment #8

In an embodiment, a user defined palette entry may be signaled through an APS. An example APS for signaling a user defined palette entry is the same as described with reference to FIG. 10. For example, when the parameter type of APS is a palette type apa_params_type==PLT_APS, the palette entry function palette_entry_data may be called within an APS to signal a user defined palette entry.

FIG. 21 is a view illustrating yet another example of a palette entry function.

Referring to FIG. 21, the parameter palette_entry_bit_depth_luma_minus8 may indicate a value obtained by subtracting 8 from a first bit depth PltBitDepthY of a user defined palette entry for a luma sample. In addition, the parameter palette_entry_bit_depth_chroma_minus8 may indicate a value obtained by subtracting 8 from a second bit depth PltBitDepthC of a user defined palette entry for a chroma sample. Here, the values of palette_entry_bit_depth_luma_minus8 and palette_entry_bit_depth_chroma_minus8 respectively may be equal to or greater than 0 and equal to or smaller than 8.

A parameter num_signalled_palette_entry_minus1 may specify a value obtained by subtracting 1 from the number of user defined palette entries included in an APS. The number of user defined palette entries may be equal to or smaller than a maximum size of a palette predictor PaletteMaxPredictorSize.

A parameter initial_predictor_palette_entries[cIdx][i] may specify a user defined palette entry used for initializing a palette predictor. Here, cIdx represents identification information of each color component (e.g., Y, Cb, Cr), and i may increase from 0 to num_signalled_palette_entry_minus1 by 1. In this case, initial_predictor_palette_entries[0][i] may have a value equal to or greater than 0 and equal to or smaller than (1<<PltBitDepthY)−1. In addition, initial_predictor_palette_entries[1][i] and initial_predictor_palette_entries[2][i] may each have a value equal to or greater than 0 and equal to or smaller than (1<<PltBitDepthC)−1.

The palette predictor may be initialized based on a high level syntax such as a slice header syntax.

FIG. 22 is a view illustrating yet another example of a slice header syntax for initializing a palette predictor. FIG. 23A and FIG. 23B are views illustrating yet another example of a process of initializing a palette predictor.

First, referring to FIG. 22, based on a value of a first palette enabling flag sps_palette_enabled_flag, a second palette enabling flag slice_palette_enabled_flag may be signaled.

The first palette enabling flag may specify whether or not a palette mode is available at a sequence level. For example, the first palette enabling flag having a first value (e.g., 0) may specify that the palette mode is not applicable to a current sequence. In contrast, the first palette enabling flag having a second value (e.g., 1) may specify that the palette mode is applicable to a current sequence. When a palette mode is applicable to a current sequence (spa_palette_enabled_flag=1), the palette mode may apply to every slice (or CTU) in the current sequence.

The second palette enabling flag may specify whether or not a palette mode is available at a slice level. For example, the second palette enabling flag having a first value (e.g., 0) may specify that the palette mode is not applicable to a current slice. In contrast, the second palette enabling flag having a second value (e.g., 1) may specify that the palette mode is applicable to the current slice. When a palette mode is applicable to a current slice (slice_palette_enabled_flag=1), the palette mode may apply to every block (or CU) in the current slice.

The second palette enabling flag may be signaled only when a palette model is available at a sequence level. For example, the second palette enabling flag may be signaled only when the first palette enabling flag has a second value (sps_palette_enabled_flag=1).

Based on a value of the first palette enabling flag sps_palette_enabled_flag, the palette entry flag slice_palette_entries_present_flag may be signaled.

The palette entry flag may specify whether or not a palette entry applicable to a current slice is derived from a palette entry function palette_entry_data in an APS which is referred to. For example, a palette entry flag having a first value (e.g., 0) may specify that a palette entry for a current slice is not derived from a palette entry function in a referred APS. In this case, a palette predictor may be reset to a predetermined value (e.g., 0), and a size of the palette predictor PredictorPaletteSize[cIdx] may be set to 0 for each color component (cIdx=0 to cIdx=2). In contrast, a palette entry flag having a second value (e.g., 1) may specify that a palette entry for a current slice is derived from a palette entry function in a referred APS. In this case, a size of the palette predictor PredictorPaletteSize[cIdx] may be set to a value obtained by adding 1 to num_signalled_palette_entry_minus1 described above with reference to FIG. 21, for each color component (cIdx=0 to cIdx=2). Meanwhile, when a palette entry flag is not signaled, the palette entry flag may be inferred to have a first value (e.g., 0).

Based on a value of a palette entry flag, identification information of a palette type APS applying to a current slice (slice_palette_entries_aps_id) may be signaled. For example, when the palette entry flag has a first value (slice_palette_entries_present_flag=0), slice_palette_entries_aps_id may not be signaled. In this case, a palette predictor may be reset to a predetermined value (e.g., 0), and a size of the palette predictor PredictorPaletteSize[cIdx] may be set to 0 for each color component (cIdx=0 to cIdx=2). In contrast, when the palette entry flag has a second value (slice_palette_entries_present_flag=1), slice_palette_entries_aps_id may be signaled. In this case, based on a palette type APS identified by slice_palette_entries_aps_id, the palette predictor for the current slice may be initialized using a user defined palette entry. In an example, slice_palette_entries_aps_id may have a same value for all the slices in a current picture.

Meanwhile, a TemporaID value of an APS NAL unit having a palette type as a parameter type and same identification information as slice_palette_entries_aps_id may be equal to or smaller than a TemporalID value of an encoded slice NAL unit.

Another example process of initializing a palette predictor using the slice header syntax of FIG. 22 is the same as illustrated in FIG. 23A and FIG. 23B.

Referring to FIG. 23A, when a current CTU is a first CTU in a brick, a palette predictor may be initialized using a user defined palette entry. Alternatively, when an entropy coding synchronization process is enabled (entropy_oding_sync_enabled_flag=1) and a current CTU is a first CTU of each CTU row (either CtbAddrInRs?% PicWidthInCtbsY is equal to 0 or BrickId[CtbAddrInBs] is not equal to BrickId[CtbAddrRsToBs[CtbAddrInRs−1]], a palette predictor may be initialized using a user defined palette entry. Otherwise, the palette predictor may be initialized to a predetermined value (e.g., 0).

A process of initializing a palette predictor by using a user defined palette predictor may be performed based on the slice header syntax of FIG. 22.

Referring to FIG. 23B, a user defined palette entry plt_predictor_plt_entry[cIdx][i] of each color component (cIdx=0 to cIdx=2) may be derived from an APS identified by slice_palette_entries_aps_id. In addition, a palette predictor size of each color component PredictorPaletteSize [cIdx] may be set to a same value as a number of user defined palette entries num_signalled_palette_entry_minus1+1.

Palette entries PredictorPaletteEntries within a palette predictor and a size of the palette predictor PredictorPaletteSize may be derived or changed as follows.

When a palette entry flag slice_palette_entries_present_flag has a second value (e.g., 1), a palette predictor for a current slice may be initialized separately for a luma sample and a chroma sample respectively.

For the luma sample (cIdx=0), a first bit depth shift value (shiftBitDepthY=BitDepthY−pltBitDepthY) indicating a difference between a bit depth of the luma sample (BitDepthY) and a bit depth of the palette predictor (pltBitDepthY) may be calculated. In addition, palette entries in the palette predictor PredictorPaletteEntries[0][i] may be set to a value obtained by shifting user defined palette entries initial_predictor_palette_entries[0][i] to left by a first bit depth shift value shiftBitDepthY.

Here, i may be equal to or greater than 0 and be smaller than a value of PredictorPaletteSize[0]. In addition, a palette predictor size PredictorPaletteSize[cIdx] may be set to a same value as a number of user defined palette entries num_signalled_palette_entry_minus1+1.

For the chroma sample (cIdx=1 and cIdx=2), a second bit depth shift value (shiftBitDepthC=BitDepthC−pltBitDepthC) indicating a difference between a bit depth of the chroma sample (BitDepthC) and a bit depth of the palette predictor (pltBitDepthC) may be calculated. In addition, palette entries in the palette predictor PredictorPaletteEntries[cIdx][i] may be set to a value obtained by shifting user defined palette entries initial_predictor_palette_entries [cIdx][i] to left by a second bit depth shift value shiftBitDepthC. Here, i may be equal to or greater than 0 and be smaller than a value of PredictorPaletteSize[cIdx]. In addition, a palette predictor size PredictorPaletteSize[cIdx] may be set to a same value as a number of user defined palette entries num_signalled_palette_entry_minus1+1.

When the palette entry flag slice_palette_entries_present_flag has a first value (e.g., 0), for every color component (cIdx=0 to cIdx=2), palette entries in a palette predictor PredictorPaletteEntries[cIdx][i] may be set to a predetermined value (e.g., 0), and a size of the palette predictor PredictorPaletteSize[cIdx] may be set to 0.

Through the above-described process, a palette predictor size of each color component PredictorPaletteSize[cIdx] and palette entries PredictorPaletteEntries[cIdx][i] for a current slice may be initialized. In this case, the palette predictor size of each color component PredictorPaletteSize[cIdx] may be equal to or smaller than a maximum size of a palette predictor PaletteMaxPredictorSize.

According to Embodiment #8, a user defined palette entry may be signaled through an APS. In addition, identification information of a palette type APS may be signaled through a slice header syntax based on whether or not a palette predictor is derived from a palette entry function. Accordingly, a palette predictor for a current slice may be adaptively initialized using a user defined palette entry.

Embodiment #9

In an embodiment, a palette predictor may be initialized based on a high level syntax such as a sequence parameter set (SPS).

FIG. 24 is a view illustrating an example of a SPS for initializing a palette predictor.

Referring to FIG. 24, based on a value of a palette enabling flag sps_palette_enabled_flag, a palette entry flag sps_palette_entries_present_flag may be signaled.

The palette enabling flag may specify whether or not a palette mode is available at a sequence level. For example, the palette enabling flag having a first value (e.g., 0) may specify that the palette mode is not applicable to a current sequence. In contrast, the palette enabling flag having a second value (e.g., 1) may specify that the palette mode is applicable to a current sequence. When a palette mode is applicable to a current sequence (sps_palette_enabled_flag=1), the palette mode may apply to every slice (or coding unit tree (CTU)) in the current sequence.

A palette entry flag may be signaled only when a palette mode is applicable in a sequence level. For example, the palette entry flag may be signaled only when a palette enabling flag has a second value (sps_palette_enabled_flag=1).

The palette entry flag may specify whether or not a palette entry applicable to a current slice is derived from a palette entry function palette_entry_data in an PPS which is referred to. For example, a palette entry flag having a first value (e.g., 0) may specify that a palette entry for a current slice is not derived from a palette entry function in a referred PPS. In this case, a palette predictor may be reset to a predetermined value (e.g., 0), and a size of the palette predictor PredictorPaletteSize[cIdx] may be set to 0 for each color component (cIdx=0 to cIdx=2). In contrast, a palette entry flag having a second value (e.g., 1) may specify that a palette entry for a current slice is derived from a palette entry function in a referred PPS. In this case, a size of the palette predictor PredictorPaletteSize[cIdx] may be set to a value obtained by adding 1 to num_signalled_palette_entry_minus1 described above with reference to FIG. 21, for each color component (cIdx=0 to cIdx=2). Meanwhile, when a palette entry flag is not signaled, the palette entry flag may be inferred to have a first value (e.g., 0).

The palette entry function palette_entry_data may be called to signal the user defined palette entry, based on a value of the palette entry flag. For example, when the palette entry flag has a first value (pps_palette_entries_present_flag=0), the palette entry function palette_entry_data may not be called. In this case, the palette predictor may have a predetermined initial value (e.g., 0). In contrast, when the palette entry flag has a second value (pps_palette_entries_present_flag=1), the palette entry function palette_entry_data may be called.

The palette entry function may include a parameter palette_entry_bit_depth_luma_minus8 and a parameter palette_entry_bit_depth_chroma_minus8, which are related to a bit depth of a user defined palette entry for each of luma and chroma samples, and a parameter num_signalled_palette_entry_minus1, which is related to a user defined palette entry for initializing the palette predictor. An example of the palette entry function is the same as described above with reference to FIG. 21.

An example process of initializing a palette predictor based on the SPS of FIG. 24 is the same as described above with reference to FIG. 23A and FIG. 23B. Specifically, when a current CTU is a first CTU in a brick, a palette predictor may be initialized using a user defined palette entry based on the SPS of FIG. 24. Alternatively, when an entropy coding synchronization process is enabled (entropy_coding_sync_enabled_flag=1) and a current CTU is a first CTU of each CTU row (either CtbAddrInRs?% PicWidthInCtbsY is equal to 0 or BrickId[CtbAddrInBs] is not equal to BrickId[CtbAddrRsToBs[CtbAddrInRs−1]], a palette predictor may be initialized using a user defined palette entry based on the SPS of FIG. 24. Otherwise, a palette predictor may be initialized to a predetermined value (e.g., 0).

According to Embodiment #9, encoding/decoding efficiency may be improved by initializing a palette predictor using a user defined palette entry.

Embodiment #10

In an embodiment, a palette predictor may be initialized based on a high level syntax such as a picture parameter set (PPS).

FIG. 25 is a view illustrating an example of a PPS for initializing a palette predictor.

Referring to FIG. 25, based on a value of a palette enabling flag sps_palette_enabled_flag, a palette entry flag pps_palette_entries_present_flag may be signaled.

The palette enabling flag may specify whether or not a palette mode is available at a sequence level. For example, the palette enabling flag having a first value (e.g., 0) may specify that the palette mode is not applicable to a current sequence. In contrast, the palette enabling flag having a second value (e.g., 1) may specify that the palette mode is applicable to a current sequence. When a palette mode is applicable to a current sequence (sps_palette_enabled_flag=1), the palette mode may apply to every slice (or coding unit tree (CTU)) in the current sequence.

A palette entry flag may be signaled only when a palette mode is applicable in a sequence level. For example, the palette entry flag may be signaled only when a palette enabling flag has a second value (sps_palette_enabled_flag=1).

The palette entry flag may specify whether or not a palette entry applicable to a current slice is derived from a palette entry function palette_entry_data in an PPS which is referred to. For example, a palette entry flag having a first value (e.g., 0) may specify that a palette entry for a current slice is not derived from a palette entry function in a referred PPS. In this case, a palette predictor may be reset to a predetermined value (e.g., 0), and a size of the palette predictor PredictorPaletteSize[cIdx] may be set to 0 for each color component (cIdx=0 to cIdx=2). In contrast, a palette entry flag having a second value (e.g., 1) may specify that a palette entry for a current slice is derived from a palette entry function in a referred PPS. In this case, a size of the palette predictor PredictorPaletteSize[cIdx] may be set to a value obtained by adding 1 to num_signalled_palette_entry_minus1 described above with reference to FIG. 21, for each color component (cIdx=0 to cIdx=2). Meanwhile, when a palette entry flag is not signaled, the palette entry flag may be inferred to have a first value (e.g., 0).

The palette entry function palette_entry_data may be called to signal the user defined palette entry, based on a value of the palette entry flag. For example, when the palette entry flag has a first value (pps_palette_entries_present_flag=0), the palette entry function palette_entry_data may not be called. In this case, the palette predictor may have a predetermined initial value (e.g., 0). In contrast, when the palette entry flag has a second value (pps_palette_entries_present_flag=1), the palette entry function palette_entry_data may be called.

The palette entry function may include a parameter palette_entry_bit_depth_luma_minus8 and a parameter palette_entry_bit_depth_chroma_minus8, which are related to a bit depth of a user defined palette entry for each of luma and chroma samples, and a parameter num_signalled_palette_entry_minus1, which is related to a user defined palette entry for initializing the palette predictor. An example of the palette entry function is the same as described above with reference to FIG. 21.

An example process of initializing a palette predictor based on the PPS of FIG. 25 is the same as described above with reference to FIG. 23A and FIG. 23B. Specifically, when a current CTU is a first CTU in a brick, a palette predictor may be initialized using a user defined palette entry based on the PPS of FIG. 25. Alternatively, when an entropy coding synchronization process is enabled (entropy_coding_sync_enabled_flag=1) and a current CTU is a first CTU of each CTU row (either CtbAddrInRs?% PicWidthInCtbsY is equal to 0 or BrickId[CtbAddrInBs] is not equal to BrickId[CtbAddrRsToBs[CtbAddrInRs−1]], a palette predictor may be initialized using a user defined palette entry based on the PPS of FIG. 25. Otherwise, a palette predictor may be initialized to a predetermined value (e.g., 0).

According to Embodiment #10, encoding/decoding efficiency may be improved by initializing a palette predictor using a user defined palette entry.

Embodiment #11

In an embodiment, a palette predictor may be initialized based on a high level syntax such as a slice header syntax.

FIG. 26 is a view illustrating yet another example of a slice header syntax for initializing a palette predictor.

Referring to FIG. 26, based on a value of a first palette enabling flag sps_palette_enabled_flag, a second palette enabling flag slice_palette_enabled_flag and a palette entry flag sps_palette_entries_present_flag may be signaled.

The first palette enabling flag may specify whether or not a palette mode is available at a sequence level. For example, the first palette enabling flag having a first value (e.g., 0) may specify that the palette mode is not applicable to a current sequence. In contrast, the first palette enabling flag having a second value (e.g., 1) may specify that the palette mode is applicable to a current sequence. When a palette mode is applicable to a current sequence (sps_palette_enabled_flag=1), the palette mode may apply to every slice (or coding unit tree (CTU)) in the current sequence.

The second palette enabling flag and the palette entry flag may be signaled only when a palette mode is applicable in a sequence level. For example, the second palette enabling flag and the palette entry flag may be signaled only when the first palette enabling flag has a second value (sps_palette_enabled_flag=1).

The second palette enabling flag may specify whether or not a palette mode is available at a slice level. For example, the second palette enabling flag having a first value (e.g., 0) may specify that the palette mode is not applicable to a current slice. In contrast, the second palette enabling flag having a second value (e.g., 1) may specify that the palette mode is applicable to a current slice. When a palette mode is applicable to a current slice (slice_palette_enabled_flag=1), the palette mode may apply to every block (or coding unit (CU)) in the current slice.

The palette entry flag may specify whether or not a palette entry applicable to a current slice is derived from a palette entry function palette_entry_data in a slice header which is referred to. For example, a palette entry flag having a first value (e.g., 0) may specify that a palette entry for a current slice is not derived from a palette entry function in a referred slice header. In this case, a palette predictor may be reset to a predetermined value (e.g., 0), and a size of the palette predictor PredictorPaletteSize[cIdx] may be set to 0 for each color component (cIdx=0 to cIdx=2). In contrast, a palette entry flag having a second value (e.g., 1) may specify that a palette entry for a current slice is derived from a palette entry function in a referred slice header. In this case, a size of the palette predictor PredictorPaletteSize[cIdx] may be set to a value obtained by adding 1 to num_signalled_palette_entry_minus1 described above with reference to FIG. 21, for each color component (cIdx=0 to cIdx=2). Meanwhile, when a palette entry flag is not signaled, the palette entry flag may be inferred to have a first value (e.g., 0).

The palette entry function palette_entry_data may be called to signal the user defined palette entry, based on a value of the palette entry flag. For example, when the palette entry flag has a first value (pps_palette_entries_present_flag=0), the palette entry function palette_entry_data may not be called. In this case, the palette predictor may have a predetermined initial value (e.g., 0). In contrast, when the palette entry flag has a second value (pps_palette_entries_present_flag=1), the palette entry function palette_entry_data may be called.

The palette entry function may include a parameter palette_entry_bit_depth_luma_minus8 and a parameter palette_entry_bit_depth_chroma_minus8, which are related to a bit depth of a user defined palette entry for each of luma and chroma samples, and a parameter num_signalled_palette_entry_minus1, which is related to a user defined palette entry for initializing the palette predictor. An example of the palette entry function is the same as described above with reference to FIG. 21.

An example process of initializing a palette predictor based on the slice header of FIG. 26 is the same as described above with reference to FIG. 23A and FIG. 23B. Specifically, when a current CTU is a first CTU in a brick, a palette predictor may be initialized using a user defined palette entry based on the slice header of FIG. 26. Alternatively, when an entropy coding synchronization process is enabled (entropy_oding_sync_enabled_flag=1) and a current CTU is a first CTU of each CTU row (either CtbAddrInRs?% PicWidthInCtbsY is equal to 0 or BrickId[CtbAddrInBs] is not equal to BrickId[CtbAddrRsToBs[CtbAddrInRs−1]], a palette predictor may be initialized using a user defined palette entry based on the SPS of FIG. 24. Otherwise, a palette predictor may be initialized to a predetermined value (e.g., 0).

According to Embodiment #11, encoding/decoding efficiency may be improved by initializing a palette predictor using a user defined palette entry.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 27:
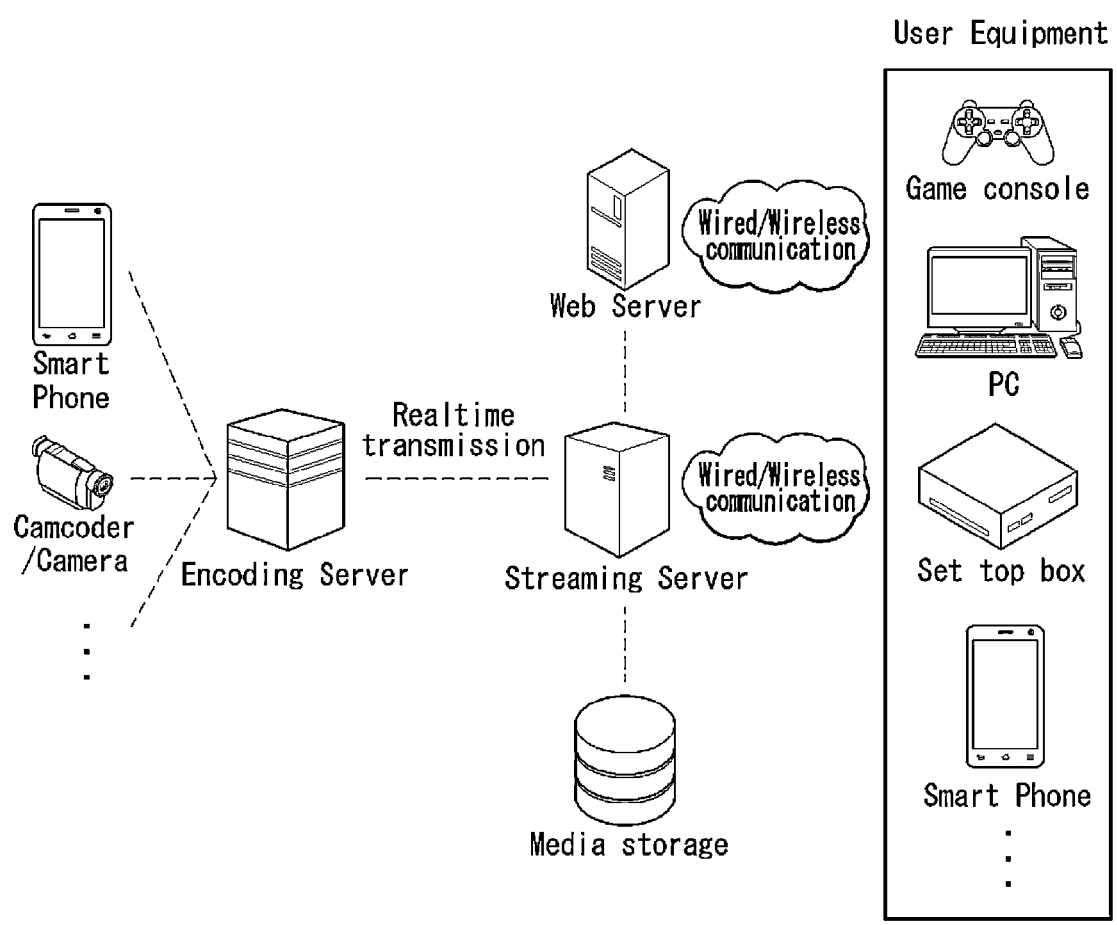
FIG. 27 is a view showing a content streaming system, to which an embodiment according to the present disclosure is applicable.

FIG. 27 is a view showing a contents streaming system, to which an embodiment of the present disclosure is applicable.

As shown in FIG. 27, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
obtaining palette information and palette index prediction information of a current block from a bitstream;
constructing a palette predictor for the current block based on the palette information and constructing a palette table for the current block based on the palette predictor;
generating a palette index map for the current block based on the palette index prediction information; and
decoding the current block based on the palette table and the palette index map,
wherein the palette predictor is initialized using a user defined palette entry obtained from at least one of an adaptation parameter set (APS), a picture parameter set (PPS) or a slice header,
wherein, based on an available APS of palette type is present for a slice including the current block, the APS is determined based on APS identification information which is obtained from a slice header,
wherein the APS identification information includes first APS identification information for a luma sample of the current block and second APS identification information for a chroma sample of the current block, and
wherein, based on the available APS of palette type does not present for the slice including the current block, the APS identification information is not obtained and the palette predictor is initialized to a predetermined value.

2. The image decoding method of claim 1, wherein, based on the second APS identification information is not obtained from the slice header, the second APS identification information is inferred to be equal to the first APS identification information.

3. The image decoding method of claim 1, wherein information related to an input bit depth of the current block is obtained from a sequence parameter set (SPS).

4. The image decoding method of claim 1, wherein the palette predictor is initialized based on a palette entry function being called from one of the APS, the PPS or the slice header.

5. The image decoding method of claim 4, wherein, based on the palette entry function is not called, the palette predictor is initialized to a predetermined value.

6. The image decoding method of claim 4, wherein information on a bit depth of the user defined palette entry is obtained from the palette entry function.

7. The image decoding method of claim 6, wherein the information on the bit depth includes first bit depth information for a luma sample of the current block and second bit depth information for a chroma sample of the current block.

8. The image decoding method of claim 1, wherein a maximum size of each of the palette predictor and the palette table is obtained from a sequence parameter set (SPS).

9. An image encoding method performed by an image encoding apparatus, the image encoding method comprising:
constructing a palette predictor for a current block and constructing a palette table for the current block based on the palette predictor;
generating a palette index map for the current block based on the palette table; and
encoding the current block based on the palette index map,
wherein the palette predictor is initialized using at least one user defined palette entry,
wherein the user defined palette entry is signaled through at least one of an adaptation parameter set (APS), a picture parameter set (PPS) or a slice header,
wherein, based on an available APS of palette type is present for a slice including the current block, APS identification information for determining the APS is signaled through a slice header,
wherein the APS identification information includes first APS identification information for a luma sample of the current block and second APS identification information for a chroma sample of the current block, and wherein, based on the available APS of palette type does not present for the slice including the current block, the APS identification information is not signaled and the palette predictor is initialized to a predetermined value.

10. A method for transmitting a bitstream generated by an image encoding method, the image encoding method comprising:

constructing a palette predictor for a current block and constructing a palette table for the current block based on the palette predictor;

generating a palette index map for the current block based on the palette table; and encoding the current block based on the palette index map, wherein the palette predictor is initialized using at least one user defined palette entry, wherein the user defined palette entry is signaled through at least one of an adaptation parameter set (APS), a picture parameter set (PPS) or a slice header, wherein, based on an available APS of palette type is present for a slice including the current block, APS identification information for determining the APS is signaled through a slice header, wherein the APS identification information includes first APS identification information for a luma sample of the current block and second APS identification information for a chroma sample of the current block, and wherein, based on the available APS of palette type does not present for the slice including the current block, the APS identification information is not signaled and the palette predictor is initialized to a predetermined value.

\* \* \* \* \*